(12) United States Patent
Niimura et al.

(10) Patent No.: US 11,271,508 B2
(45) Date of Patent: Mar. 8, 2022

(54) POWER CONVERSION DEVICE, MOTOR DRIVING SYSTEM, AND CONTROL METHOD

(71) Applicant: TOSHIBA MITSUBISHI-ELECTRIC INDUSTRIAL SYSTEMS CORPORATION, Chuo-ku (JP)

(72) Inventors: Naoto Niimura, Tokyo (JP); Teruo Yoshino, Tokyo (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 22 days.

(21) Appl. No.: 16/975,880

(22) PCT Filed: Feb. 15, 2019

(86) PCT No.: PCT/JP2019/005572
§ 371 (c)(1),
(2) Date: Aug. 26, 2020

(87) PCT Pub. No.: WO2020/166065
PCT Pub. Date: Aug. 20, 2020

(65) Prior Publication Data
US 2021/0021224 A1 Jan. 21, 2021

(51) Int. Cl.
*H02P 27/08* (2006.01)
*H02P 23/26* (2016.01)

(52) U.S. Cl.
CPC .............. *H02P 23/26* (2016.02); *H02P 27/08* (2013.01); *H02P 2201/15* (2013.01)

(58) Field of Classification Search
CPC ....... H02P 23/26; H02P 27/08; H02P 2201/15
See application file for complete search history.

(56) References Cited

U.S. PATENT DOCUMENTS

| 6,954,366 B2* | 10/2005 | Lai | ........................ | H02M 5/293 |
| | | | | 363/71 |
| 7,663,268 B2* | 2/2010 | Wen | ........................ | H02M 7/49 |
| | | | | 307/82 |

(Continued)

FOREIGN PATENT DOCUMENTS

| CN | 104380586 A | 2/2015 |
| JP | 10-66333 A | 3/1998 |

(Continued)

OTHER PUBLICATIONS

Office Action dated Feb. 19, 2021 in corresponding Indian Patent Application No. 202017008960 (with English Translation), 5 pages.

*Primary Examiner* — Rina I Duda
(74) *Attorney, Agent, or Firm* — Oblon, McClelland, Maier & Neustadt, L.L.P.

(57) ABSTRACT

In a power converter, a first single-phase AC conversion unit, which is connected to a first line of a first phase and a second line of a second phase of a first three-phase AC, a second single-phase AC conversion unit, which is connected to the second line of the second phase and a third line of a third phase of the first three-phase AC, and a third single-phase AC conversion unit, which is connected to the third line of the third phase and the first line of the first phase of the first three-phase AC, form a delta-connected load for an AC power supply system. At least the first single-phase AC conversion unit, the second single-phase AC conversion unit, and the third single-phase AC conversion unit form a first set in which respective output terminals are connected in series to one another, and the first set, and a second set and a third set, which are different from the first set, form each phase of a star connected power supply. A reactive power control unit controls a reactive power of a converter of each single-phase AC conversion unit based on a reactive power (Continued)

command value generated based on an acquired value related to an active power.

15 Claims, 12 Drawing Sheets

(56) References Cited

U.S. PATENT DOCUMENTS

| | | | | |
|---|---|---|---|---|
| 8,217,533 B2* | 7/2012 | Jones | ............... | H02J 3/01 |
| | | | | 307/82 |
| 2011/0199033 A1* | 8/2011 | Abolhassani | ....... | H02M 5/4585 |
| | | | | 318/438 |
| 2014/0152012 A1* | 6/2014 | Kim | ............... | H02J 3/18 |
| | | | | 290/44 |
| 2016/0164427 A1* | 6/2016 | Chapman | ............ | H02J 3/38 |
| | | | | 363/37 |

FOREIGN PATENT DOCUMENTS

| | | |
|---|---|---|
| JP | 2007-124779 A | 5/2007 |
| WO | WO 2014/196013 A1 | 12/2014 |
| WO | WO 2017/094379 A1 | 6/2017 |

* cited by examiner

POWER CONVERSION DEVICE, MOTOR DRIVING SYSTEM, AND CONTROL METHOD

TECHNICAL FIELD

Embodiments of the present invention relate to a power conversion device, a motor driving system, and a control method.

BACKGROUND ART

There is a power conversion device (indirect AC converter) that converts first multi-phase AC power supplied from an AC power supply system side into second multi-phase AC power. For example, a motor driving system generates second multi-phase AC power by the power conversion device and drives an AC motor by the second power. Since active power supplied to each phase of the second AC power becomes unbalanced due to an event on a load side of the power conversion device at the time of startup of the AC motor, low-speed rotation and the like, the AC power supply system side that supplies the first multi-phase AC power may be affected by this unbalance.

CITATION LIST

Patent Literature

[Patent Literature 1]
PCT International Publication No. WO 2014-196013

SUMMARY OF INVENTION

Technical Problem

An object of the present invention is to provide a power conversion device and a motor driving system, by which it is possible to reduce the influence of unbalance between the phases of active power supplied to a load side of a power conversion device to an AC power supply system side.

Means for Solving the Problem

A power conversion device according to an embodiment includes a plurality of single-phase AC conversion unit, a controller, an AC power input terminal, and an AC power output terminal. The AC power input terminal receives a first three-phase AC power from an AC power supply system. The AC power output terminal outputs a second three-phase AC power to a system to which a load is connected. Each of the plurality of single-phase AC conversion units has at least first and second switching elements and is configured to convert a part of the first three-phase AC power supplied to input terminals thereof to output from output terminals thereof. The controller controls each of the first and second switching elements to be brought into any one of an ON state as a conductive state and an OFF state as a non-conductive state. The single-phase AC conversion unit includes at least a voltage type converter, an inverter, and an insulating unit. The voltage type converter converts single-phase AC power based on the first three-phase AC power into DC power by switching of the first switching element and outputs the DC power to a capacitor. The inverter converts second DC power based on the DC power converted by the converter into second single-phase AC power by switching of the second switching element and output the second single-phase AC power to the output terminals of the single-phase AC conversion unit. The insulating unit includes a transformer and insulates between the input terminals and the output terminals of the single-phase AC conversion unit and transmits power to be supplied to at least the load. In the plurality of single-phase AC conversion units, a first single-phase AC conversion unit, which has input terminals connected to a first line of a first phase and a second line of a second phase of the first three-phase AC, a second single-phase AC conversion unit, which is connected to the second line of the second phase and a third line of a third phase of the first three-phase AC, and a third single-phase AC conversion unit, which is connected to the third line of the third phase and the first line of the first phase of the first three-phase AC, form a delta-connected load for the AC power supply system. At least the first single-phase AC conversion unit, the second single-phase AC conversion unit, and the third single-phase AC conversion unit form a first set in which respective output terminals are connected in series to one another, and the first set, and a second set and a third set, which are different from the first set, form each phase of a star connected power supply. A first output terminal of a first end of the plurality of single-phase AC conversion units connected in series is connected to an output terminal of the second three-phase AC, and a second output terminal of a second end opposite to the first end is connected to a neutral point of the second three-phase AC. The controller includes: an active power acquisition unit configured to acquire a value related to active power supplied to a side of the load from output terminals of the second three-phase AC; a reactive power command value generation unit configured to generate a reactive power command value for designating reactive power that is output from the AC power input terminals to the AC power supply system, based on the value related to the active power acquired by the active power acquisition unit; and a reactive power control unit configured to control the reactive power of the converter to which the reactive power command value is supplied.

DESCRIPTION OF EMBODIMENTS

Hereinafter, a power conversion device, a motor driving system, and a control method of embodiments will be described with reference to the drawings. The power conversion device, the motor driving system, and the control method to be described below supply desired AC power to an AC motor (motor) that is an example of a load.

The power conversion device of the embodiments includes an indirect AC converter. A description of connections in the embodiments includes electrical connections.

First Embodiment

Figure 1:
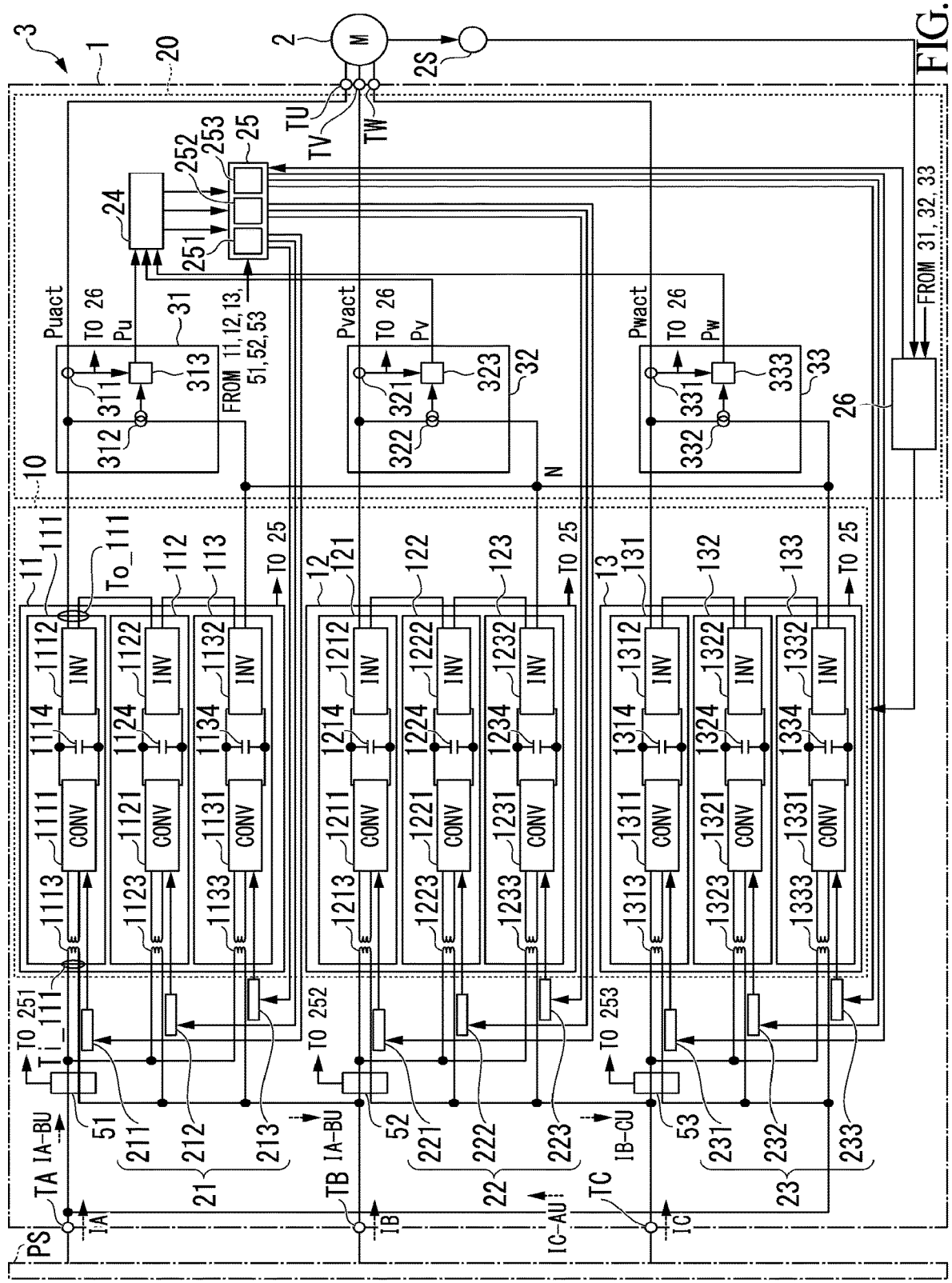
FIG. 1 is a configuration diagram of a main circuit of a power conversion device of an embodiment.

Next, a configuration example of a main circuit of a power conversion device will be described. FIG. 1 is a configuration diagram of a main circuit of a power conversion device in an embodiment.

A power conversion device 1 illustrated in FIG. 1 includes input terminals TA, TB, and TC (AC power input terminals) and output terminals TU, TV, and TW (AC power output terminals). The input terminals TA, TB, and TC are connected to phase A, phase B, phase C power transmission lines of a three-phase AC power supply system PS, and receive first three-phase AC power from the AC power supply system PS. The output terminals TU, TV, and TW are connected to phase U, phase V, and phase W power transmission lines of a system to which a three-phase motor (M) 2 (an AC motor) is connected. For example, when a direction for supplying active power from the second three-phase AC output terminal TU (a first-phase output terminal) to the motor 2 is used as a reference, a terminal for outputting a voltage delayed by an electric angle of 120° from a reference phase θ becomes the output terminal TV (a second-phase output terminal) and a terminal for outputting a voltage delayed by 240° from the reference phase θ becomes the output terminal TW (a third-phase output terminal).

The power conversion device 1 converts power in both directions between the input terminals TA, TB, and TC and the output terminals TU, TV, and TW.

The power conversion device 1 is an example of a driving device of the motor 2 (a motor driving device). The power conversion device 1 and the motor 2 are referred to as a motor driving system 3. The motor 2 may be provided with a speed sensor 2S. The speed sensor 2S detects a rotation speed of a rotor of the motor 2 and outputs a rotation speed ωFB.

The power conversion device 1, for example, includes an AC conversion unit main circuit 10, a controller 20, and current voltage detection circuits 51 to 53.

The AC conversion unit main circuit 10, for example, includes a U-phase main circuit 11, a V-phase main circuit 12, and a W-phase main circuit 13.

The U-phase main circuit 11 includes single-phase AC conversion units 111 to 113. In the single-phase AC conversion units 111 to 113, their input sides are correlated to lines of the phase A and the phase B (a first pair of lines) of the AC power supply system PS and their output sides are correlated to the phase U. The V-phase main circuit 12 includes single-phase AC conversion units 121 to 123. In the single-phase AC conversion units 121 to 123, their input sides are correlated to lines of the phase B and the phase C (a second pair of lines) of the AC power supply system PS and their output sides are correlated to the phase V. The W-phase main circuit 13 includes single-phase AC conversion units 131 to 133. In the single-phase AC conversion units 131 to 133, their input sides are correlated to lines of the phase C and the phase A (a third pair of lines) of the AC power supply system PS and their output sides are correlated to the phase W. When the plurality of single-phase AC conversion units are collectively indicated, they are simply referred to as a single-phase AC conversion unit 100. The single-phase AC conversion unit 100 converts a part of the first three-phase AC power supplied to a pair of input terminals Ti_111 or the like of the single-phase AC conversion unit 100, and outputs the converted power from a pair of output terminals To_111 or the like of the single-phase AC conversion unit 100.

The single-phase AC conversion units 111 to 113 of the U-phase main circuit 11 will be described.

The single-phase AC conversion unit 111 includes at least a converter 1111 (CONV in the drawing, the same applies below), an inverter 1112 (INV in the drawing, the same applies below), a transformer 1113, and a capacitor 1114. The single-phase AC conversion unit 112 includes at least a converter 1121, an inverter 1122, a transformer 1123, and a capacitor 1124. The single-phase AC conversion unit 113 includes at least a converter 1131, an inverter 1132, a transformer 1133, and a capacitor 1134. The transformers 1113, 1123, and 1133 are examples of insulating units.

For example, the transformer 1113 is an insulation type single-phase transformer having a primary winding and a secondary winding. The transformer 1113 transmits power while insulating between the input terminal Ti_111 and the output terminal To_111 of the single-phase AC conversion unit 111, thereby supplying power to be supplied to at least the motor 2 to a rear stage. The single-phase AC power transformed by the transformer 1113 is an example of single-phase AC power based on first single-phase AC power.

The converter 1111 is a voltage-type AC/DC converter (a voltage-type self-excited converter). The converter 1111 includes switching elements SD1a to SD1d (FIG. 2) or the like, and converts power by the switching of the switching elements SD1a to SD1d. The converter 1111 converts the single-phase AC power transformed by the transformer 1113 into DC power and outputs the DC power to the capacitor 1114. The capacitor 1114 stores the DC power output from the converter 1111.

The inverter 1112 includes switching elements SD2a to SD2d (FIG. 2) or the like, and is a DC/AC converter that converts power by the switching of the switching elements SD2a to SD2d. The inverter 1112 converts DC power based on the DC power converted by the converter 1111 into second single-phase AC power, and outputs the second single-phase AC power to the output terminal of the single-phase AC conversion unit 111. For example, the inverter 1112 is formed as a voltage-type DC/AC converter by a combination with the capacitor 1114.

In the following description of the embodiment, the single-phase AC conversion unit 111 including a set of at least the converter 1111 and the inverter 1112 may be referred to as a cell. The single-phase AC conversion unit 111 is an example of the cell.

Connections between the elements in the single-phase AC conversion unit 111 are as follows.

The primary winding of the transformer 1113 is connected to the input terminal Ti_111 of the single-phase AC conversion unit 111. The input of the converter 1111 is connected to the secondary winding of the transformer 1113. The input of the inverter 1112 is connected to the output of the converter 1111 via a DC link. The output terminal To_111 of the single-phase AC conversion unit 111 is connected to the output of the inverter 1112. The capacitor 1114 for smoothing is provided to the DC link within the single-phase AC conversion unit 111.

Due to these connections, the input voltage of the inverter 1112 becomes equal to the output voltage of the converter 1111.

The single-phase AC conversion units 121 to 123 of the V-phase main circuit 12 will be described. The single-phase AC conversion unit 121 includes at least a converter 1211, an inverter 1212, a transformer 1213, and a capacitor 1214. The single-phase AC conversion unit 122 includes at least a converter 1221, an inverter 1222, a transformer 1223, and a capacitor 1224. The single-phase AC conversion unit 123 includes at least a converter 1231, an inverter 1232, a transformer 1233, and a capacitor 1234. The transformers 1213, 1223, and 1233 are examples of insulating units. A detailed description of the single-phase AC conversion unit 112 will be omitted, but configurations and connections in the single-phase AC conversion unit 112 are equivalent to those of the single-phase AC conversion unit 111. In addition, a capacitor 1124 for smoothing is provided to a DC link within the single-phase AC conversion unit 112.

The single-phase AC conversion units 131 to 133 of the W-phase main circuit 13 will be described. The single-phase AC conversion unit 131 includes at least a converter 1311, an inverter 1312, a transformer 1313, and a capacitor 1314. The single-phase AC conversion unit 132 includes at least a converter 1321, an inverter 1322, a transformer 1323, and a capacitor 1324. The single-phase AC conversion unit 133 includes at least a converter 1331, an inverter 1332, a transformer 1333, and a capacitor 1334. The transformers 1313, 1323, and 1333 are examples of insulating units. A detailed description of the single-phase AC conversion unit 113 will be omitted, but configurations and connections in the single-phase AC conversion unit 113 are equivalent to those of the single-phase AC conversion unit 111. In addition, a capacitor 1134 for smoothing is provided to a DC link within the single-phase AC conversion unit 113.

The input side of the single-phase AC conversion unit 100 is connected to any one of the lines of the AC power supply system PS. For example, in the case of the single-phase AC conversion units 111 to 113, the input terminal of each of the single-phase AC conversion units is connected to a line of the phase A (first phase) and a line of the phase B (second phase) of the first three-phase AC. The input sides of the single-phase AC conversion units 111 to 113 are connected in parallel to one another. Similarly, the input sides of the single-phase AC conversion units 121 to 123 are connected to the line of the phase B and a line of the phase C (hereinafter, referred to as a line B-line C). The input sides of the single-phase AC conversion units 131 to 133 are connected to the line of the phase C and the line of the phase A (hereinafter, referred to as a line C-line A).

As described above, the AC conversion unit main circuit 10 is connected to any one of the line A-line B, the line B-line C, and the line C-line A of the AC power supply system PS. The AC conversion unit main circuit 10 is connected to the lines of the AC power supply system PS. The AC conversion unit main circuit 10 connected as described above forms a delta-connected load for the AC power supply system PS.

The output side of the single-phase AC conversion unit 100 is provided between the output terminal of any phase of the phase U (the first phase), the phase V (the second phase), and the phase W and a neutral point N. For example, in the cases of the single-phase AC conversion units 111 to 113, the output terminal of each of the single-phase AC conversion units is correlated to the phase U of the second three-phase AC. The output terminals of the single-phase AC conversion units 121 to 123 are correlated to the phase V of the second three-phase AC. The output terminals of the single-phase AC conversion units 131 to 133 are correlated to the phase W of the second three-phase AC. The output side of the single-phase AC conversion unit 100 is connected in series to the output of another single-phase AC conversion unit 100 correlated to the same phase, thereby forming one star connected phase. The number of AC conversion unit main circuits 10 correlated to each phase is the same. The output side of the single-phase AC conversion unit 100 is formed as described above, and serves as a power supply that supplies power to the motor 2.

The controller 20 controls each of at least the switching elements SD1a to SD1d (FIG. 2) included in the converter 1111 and at least the switching elements SD2a to SD2d included in the inverter 1112 to be brought into any one of an ON state as a conductive state and an OFF state as s non-conductive state.

For example, the controller 20 includes individual control units 21 to 23, a reactive power command value generation unit 24, a line converter control unit 25 (a reactive power control unit), an inverter control unit 26, and active power acquisition units 31 to 33.

The individual control units 21 to 23 receive commands from the line converter control unit 25 to be described below and supplies a gate pulse to each converter in each single-phase AC conversion unit 100, thereby controlling power conversion by each converter.

For example, the individual control unit 21 includes U-phase individual control units 211 to 213.

The U-phase individual control unit 211 supplies the gate pulse to the converter 1111 of the single-phase AC conversion unit 111 on the basis of the control of the line converter control unit 25 to be described below. The U-phase individual control unit 212 supplies the gate pulse to the converter 1121 of the single-phase AC conversion unit 112 on the basis of the control of the line converter control unit 25. The U-phase individual control unit 213 supplies the gate pulse to the converter 1131 of the single-phase AC conversion unit 113 on the basis of the control of the line converter control unit 25

The individual control unit 22 includes V-phase individual control units 221 to 223. The individual control unit 23 includes W-phase individual control units 231 to 233. For the individual control units 22 and 23, reception of commands from the line converter control unit 25, a relation between the individual control unit 22 and the converter 1121 of the single-phase AC conversion unit 112, a relation between the individual control unit 23 and the converter 1131 of the single-phase AC conversion unit 113, or the like are the same as a relation between the individual control unit 21 and the converter 1111 of the single-phase AC conversion unit 111.

The reactive power command value generation unit 24 generates a reactive power command value for designating reactive power, which is output from the input terminals TA, TB, and TC to the AC power supply system PS by the AC conversion unit main circuit 10 (power converter main circuit), on the basis of a value related to the active power, which is supplied from the output terminals TU, TV, and TW to the motor 2 by the AC conversion unit main circuit 10. For example, the value related to the active power, which is supplied to the motor 2, may be a measured value of the active power, which is supplied to the motor 2, a value calculated from the value of the active power according to a predetermined conversion equation, an approximate value of the value of the active power, or the like. The measured value of the active power is not limited to being directly measured and may be indirectly measured. A value acquired by the active power acquisition unit to be described below is an example of a value related to the active power which is supplied to the motor 2. Details of the reactive power command value generation unit 24 will be described below.

The line converter control unit 25 controls the active power of a corresponding cell converter on the basis of a line current of the AC power supply system PS. Moreover, on the basis of the reactive power command value generated by the reactive power command value generation unit 24, the line converter control unit 25 (reactive power control unit) controls the reactive power of a converter corresponding to the reactive power command value. For example, the line converter control unit 25 includes a line converter control unit 251, a line converter control unit 252, and a line converter control unit 253. For reactive power control, the line converter control units 251 to 253 control the individual control units 21 to 23, respectively. Details of the line converter control unit 25 will be described below.

The inverter control unit 26, for example, generates the gate pulse by performing speed control based on the rotation speed coFB and current control based on U, V, and W-phase output currents Iu, Iv, and Iw. The inverter control unit 26 sends the generated gate pulse to the AC conversion unit main circuit 10 and controls each inverter in the AC conversion unit main circuit 10. The inverter control unit 26 may control each converter of a stage preceding from each inverter in the AC conversion unit main circuit 10 by a command for the converter control unit 25. Details of the inverter control unit 26 will be described below.

The active power acquisition unit 31 includes a current sensor 311 (current measurement section), a voltage sensor 312 (voltage measurement section), and an active power calculation unit 313. The current sensor 311 detects the U-phase output current Iu. The voltage sensor 312 detects a U-phase phase voltage. The active power calculation unit 313 calculates U-phase active power Pu on the basis of the U-phase output current Iu and the U-phase phase voltage. The active power Pu is indirectly acquired from actual U-phase active power Puact by the active power acquisition unit 31.

The active power acquisition unit 32 includes a current sensor 321, a voltage sensor 322, and an active power calculation unit 323. The current sensor 321 detects the V-phase output current Iv. The voltage sensor 322 detects a V-phase phase voltage. The active power calculation unit 323 calculates V-phase active power Pv on the basis of the V-phase output current Iv and the V-phase phase voltage. The active power Pv is indirectly acquired from actual V-phase active power Pvact by the active power acquisition unit 32.

The active power acquisition unit 33 includes a current sensor 331, a voltage sensor 332, and an active power calculation unit 333. The current sensor 331 detects the W-phase output current Iw. The voltage sensor 332 detects a W-phase phase voltage. The active power calculation unit 333 calculates W-phase active power Pw on the basis of the W-phase output current Iw and the W-phase phase voltage. The active power Pw is indirectly acquired from actual W-phase active power Pwact by the active power acquisition unit 33.

The active power acquisition units 31 to 33 acquire the values related to the active power supplied to the motor 2 side via the output terminals TU, TV, and TW of each phase of the second three-phase AC. In FIG. 1, connections from the active power acquisition units 31 to 33 to the inverter control unit 26 and connections from the inverter control unit 26 to the inverters are partially omitted.

The current voltage detection circuit 51 detects a line current 1A-BU and a line voltage on the input side of the U-phase main circuit 11 and supplies the detection result to the line converter control unit 251. The current voltage detection circuit 52 detects a line current IB-CU and a line voltage on the input side of the V-phase main circuit 12 and supplies the detection result to the line converter control unit 252. The current voltage detection circuit 53 detects a line current IC-AU and a line voltage on the input side of the W-phase main circuit 13 and supplies the detection result to the line converter control unit 253. Details of the current voltage detection circuit 51 will be described below. In addition, the current voltage detection circuits 52 and 53 may be equivalent to the current voltage detection circuit 51.

In addition to the aforementioned each unit, the AC conversion unit main circuit 10 may be provided with a current voltage detection circuit or the like (not illustrated in FIG. 1).

Figure 2:
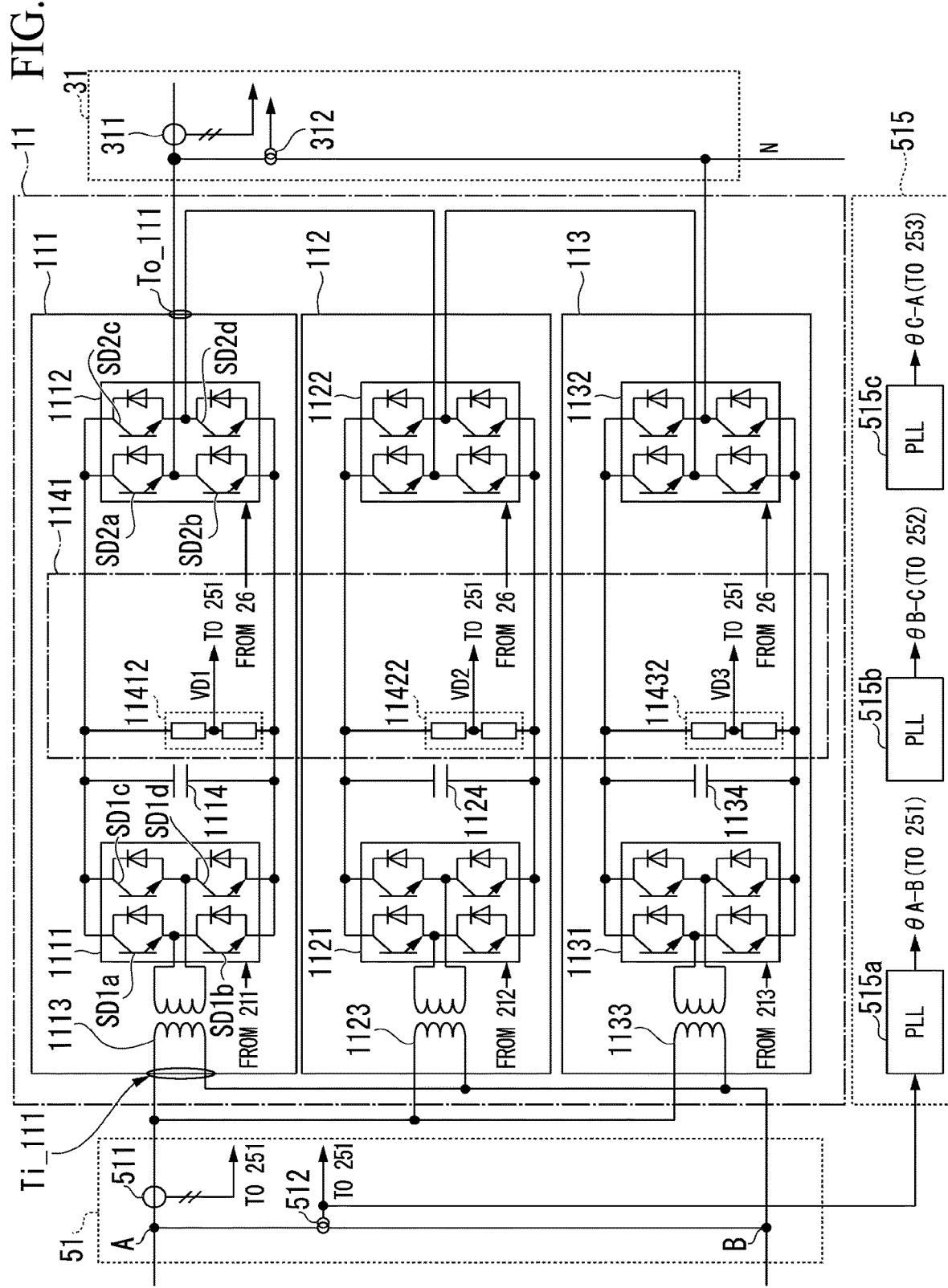
FIG. 2 is a configuration diagram of a U-phase main circuit of an embodiment.

With reference to FIG. 2, an example of a current voltage detection circuit related to the U-phase main circuit 11 will be described.

FIG. 2 is a configuration diagram of the U-phase main circuit 11 of the embodiment.

For example, the current voltage detection circuit is provided on the input side of the U-phase main circuit 11, to the DC link in the U-phase main circuit 11, and on the output side of the U-phase main circuit 11. The aforementioned active power acquisition unit 31 is an example of the current voltage detection circuit on the output side. The U-phase main circuit 11, for example, includes a current voltage detection circuit 1141.

The current voltage detection circuit 1141 detects the voltages of the DC links of at least the U-phase main circuit 11, the V-phase main circuit 12, and the W-phase main circuit 13. The current voltage detection circuit 1141, for example, includes voltage sensors 11412, 11422, and 11432. In addition, the current voltage detection circuit 1141 may include a current sensor (not illustrated).

The voltage sensor 11412 detects a DC voltage VD1 of the DC link of the single-phase AC conversion unit 111. The voltage sensor 11412 outputs the detection result to the line converter control unit 251. For example, the voltage sensor 11412 may divide the DC voltage of the DC link of the U-phase main circuit 11 by resistors provided therein at a predetermined specific ratio, and output the divided voltage.

The voltage sensor 11422 detects a DC voltage VD2 of the DC link of the single-phase AC conversion unit 112. The voltage sensor 11422 outputs the detection result to the line converter control unit 251.

The voltage sensor 11432 detects a DC voltage VD3 of the DC link of the single-phase AC conversion unit 113. The voltage sensor 11432 outputs the detection result to the line converter control unit 251.

The current voltage detection circuit 51 detects a current and a voltage on the input side of the U-phase main circuit 11. The current voltage detection circuit 51, for example, includes a current sensor 511 and a voltage sensor 512. The current sensor 511 detects a line current flowing through each of the primary windings of the transformers 1113, 1123, and 1133 in the U-phase main circuit 11. The current detected by the current sensor 511 is the sum of the line currents flowing through the primary windings of the transformers 1113, 1123, and 1133 in the U-phase main circuit 11.

The voltage sensor 512 detects a line voltage on the input side of the U-phase main circuit 11. The current sensor 511 and the voltage sensor 512 output the detection results to the line converter control unit 251. Moreover, the voltage sensor 512 outputs the detection result to a PLL circuit 515.

The PLL circuit 515 includes a U-phase PLL circuit 515a, a V-phase PLL circuit 515b, and a W-phase PLL circuit 515c. The U-phase PLL circuit 515a (PLL in the drawing), for example, extracts a fundamental wave component or the like of the voltage of the AC power supply system PS on the basis of the (A-B) line-to-line voltage, and generates a phase θ A-B. The phase θ A-B is synchronized with the phase of the fundamental wave of the voltage of the AC power supply system PS. The U-phase PLL circuit 515a supplies the phase θ A-B to the line converter control unit 251 (FIG. 4) to be described below.

The V-phase PLL circuit 515b (PLL in the drawing) and the W-phase PLL circuit 515c (PLL in the drawing) illustrated in the drawing are used for the control of the phase V and the phase W, respectively, as will be described below.

Although a detailed description is omitted, the V-phase main circuit 12 and the W-phase main circuit 13 are formed in the same manner as the U-phase main circuit 11, are allocated to the phase V and the phase W, instead of the phase U, and have target phases different from each other. In addition, the V-phase PLL circuit 515b related to the control of the V-phase main circuit 12 detects the phase of the (B-C) line-to-line voltage, generates a phase θ B-C, and supplies the phase θ B-C to the line converter control unit 252. The W-phase PLL circuit 515c related to the control of the W-phase main circuit 13 detects the phase of the (C-A) line-to-line voltage, generates a phase θ C-A, and supplies the phase θ C-A to the line converter control unit 253. Between the phases θ A-B, θ B-C, and phase θ C-A, there are phase differences of 120°.

Although FIG. 2 illustrates a configuration in which the phase signal is generated from each line voltage by the single phase PLL, the three phase signals θ A-B, θ B-C, and θ C-A corresponding to the three line voltages may be generated using a three-phase PLL that detects a phase from a three-phase phase voltage. In such a case, the phase signals are generated by taking into account a phase difference between the phase voltage and the line voltage.

The converter 1111, for example, includes the semiconductor switching elements SD1a to SD1d. For example, each of the semiconductor switching elements SD1a to SD1d includes a switching element and a diode connected in anti-parallel to the switching element. The semiconductor switching element SD1a and the semiconductor switching element SD1b are connected in series to each other. The semiconductor switching element SD1c and the semiconductor switching element SD1d are connected in series to each other. The semiconductor switching elements SD1a and SD1b connected in series to each other and the semiconductor switching elements SD1c and SD1d connected in series to each other are connected in parallel to each other. The semiconductor switching elements SD1a to SD1d are controlled by the gate pulse from the U-phase individual control unit 211.

The inverter 1112, for example, includes the semiconductor switching elements SD2a to SD2d. For example, each of the semiconductor switching elements SD2a to SD2d includes a switching element and a diode connected in anti-parallel to the switching element. The semiconductor switching element SD2a and the semiconductor switching element SD2b are connected in series to each other. The semiconductor switching elements SD2c and SD2d are connected in series to each other. The semiconductor switching elements SD2a and SD2b connected in series to each other and the semiconductor switching elements SD2c and SD2d connected in series to each other are connected in parallel to each other. The semiconductor switching element SD2 is controlled by the gate pulse from the inverter control unit 26.

For example, the semiconductor switching elements SD1a to SD1d and SD2a to SD2d include a power switching element such as an insulated gate bipolar transistor (IGBT) and a field effect transistor (FET).

Figure 3:
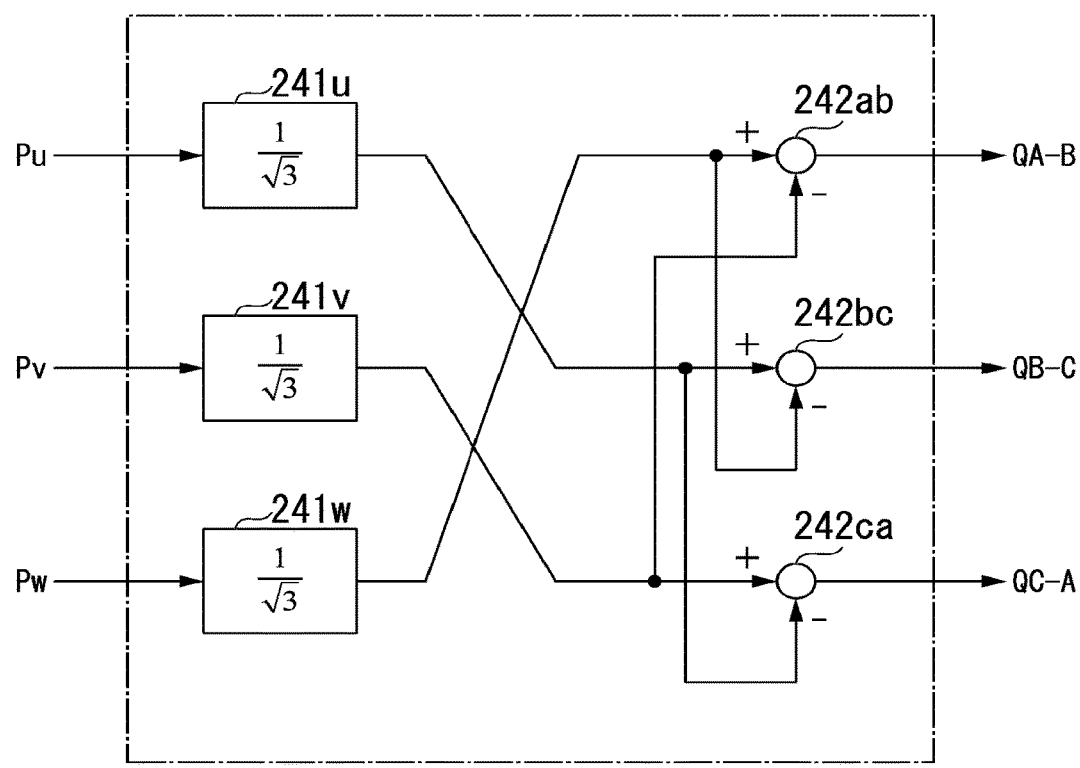
FIG. 3 is a configuration diagram of a reactive power command value generation unit of an embodiment.

FIG. 3 is a configuration diagram of the reactive power command value generation unit of the embodiment.

The reactive power command value generation unit 24 includes multipliers 241u, 241v, and 241w and subtractors 242ab, 242bc, and 242ca. The multiplier 241u multiplies the active power Pu acquired by the active power acquisition unit 31 by a reciprocal of the square root of 3 (hereinafter, referred to as $1/\sqrt{3}$). The multiplier 241v multiplies the active power Pv acquired by the active power acquisition unit 32 by $1/\sqrt{3}$. The multiplier 241w multiplies the active power Pw acquired by the active power acquisition unit 33 by $1/\sqrt{3}$.

The subtractor 242ab subtracts the operation result of the multiplier 241v from the operation result of the multiplier 241w and outputs a reactive power command value QA-B as the subtraction result. The subtractor 242bc subtracts the operation result of the multiplier 241w from the operation result of the multiplier 241u and outputs a reactive power command value QB-C of the subtraction result. The subtractor 242ca subtracts the operation result of the multiplier 241u from the operation result of the multiplier 241v and outputs a reactive power command value QC-A of the subtraction result.

In the sign of the active power of FIG. 3, a direction in which the active power is supplied from the power conversion device 1 to the motor 2 (load) is defined as positive (+). Similarly, regarding the sign of the reactive power, capacitive output is defined as positive (+).

For example, voltages output from the output terminal TV and the output terminal TW, respectively, are voltages delayed from the phase θ of the voltage of the output terminal TU (the first-phase output terminal) by 120° and 240°.

In the above case, the reactive power command value generation unit 24 calculates the reactive power command value QB-C for the converters of the plurality of single-phase AC conversion units corresponding to the phase of the output terminal TV, that is, the phase V, and the reactive power command value QC-A for the converters of the plurality of single-phase AC conversion units corresponding to the phase of the output terminal TW, that is, the phase W, with respect to the active power Pu of the phase U which is the phase of the output terminal TU. The converters of the plurality of single-phase AC conversion units corresponding to the phase V are the plurality of converters in the V-phase main circuit 12, and specifically, are the converters 1211, 1221, and 1231. The converters of the plurality of single-phase AC conversion units corresponding to the phase W are the plurality of converters in the W-phase main circuit 13, and specifically, are the converters 1311, 1321, and 1331.

For example, for a reactive power command value of another phase for the active power Pu of the phase U which is the phase of the output terminal TU that is the reactive power command value for the plurality of converters in the V-phase main circuit 12, the reactive power command value generation unit 24 calculates the reactive power command value QB-C to which power for outputting capacitive reactive power has been added. Moreover, for a reactive power command value of another phase for the active power Pu of the phase U that is the reactive power command value for the plurality of converters in the W-phase main circuit 13, the reactive power command value generation unit 24 calculates the reactive power command value QC-A from which power for outputting inductive reactive power has been subtracted. For example, the active power Pu of the phase U which is the phase of the output terminal TU is called the active power Puact of the output terminal TU. The phase V and the phase W are the same as the phase U.

Although the above exemplifies the case of the reactive power command value for the active power Puact (FIG. 1) of the output terminal TU, the case of the reactive power command value for the active power Pvact (FIG. 1) of the output terminal TV and the case of the reactive power command value for the active power Pwact (FIG. 1) of the output terminal TW are the same as the case of the reactive power command value for the active power Puact of the output terminal TU.

In addition, the reactive power command value generation unit 24 may generate a reactive power command value in which a product of the amount of the active power acquired by the active power acquisition unit 31 or the like and $1/\sqrt{3}$ is employed as the amount of reactive power.

Figure 4:
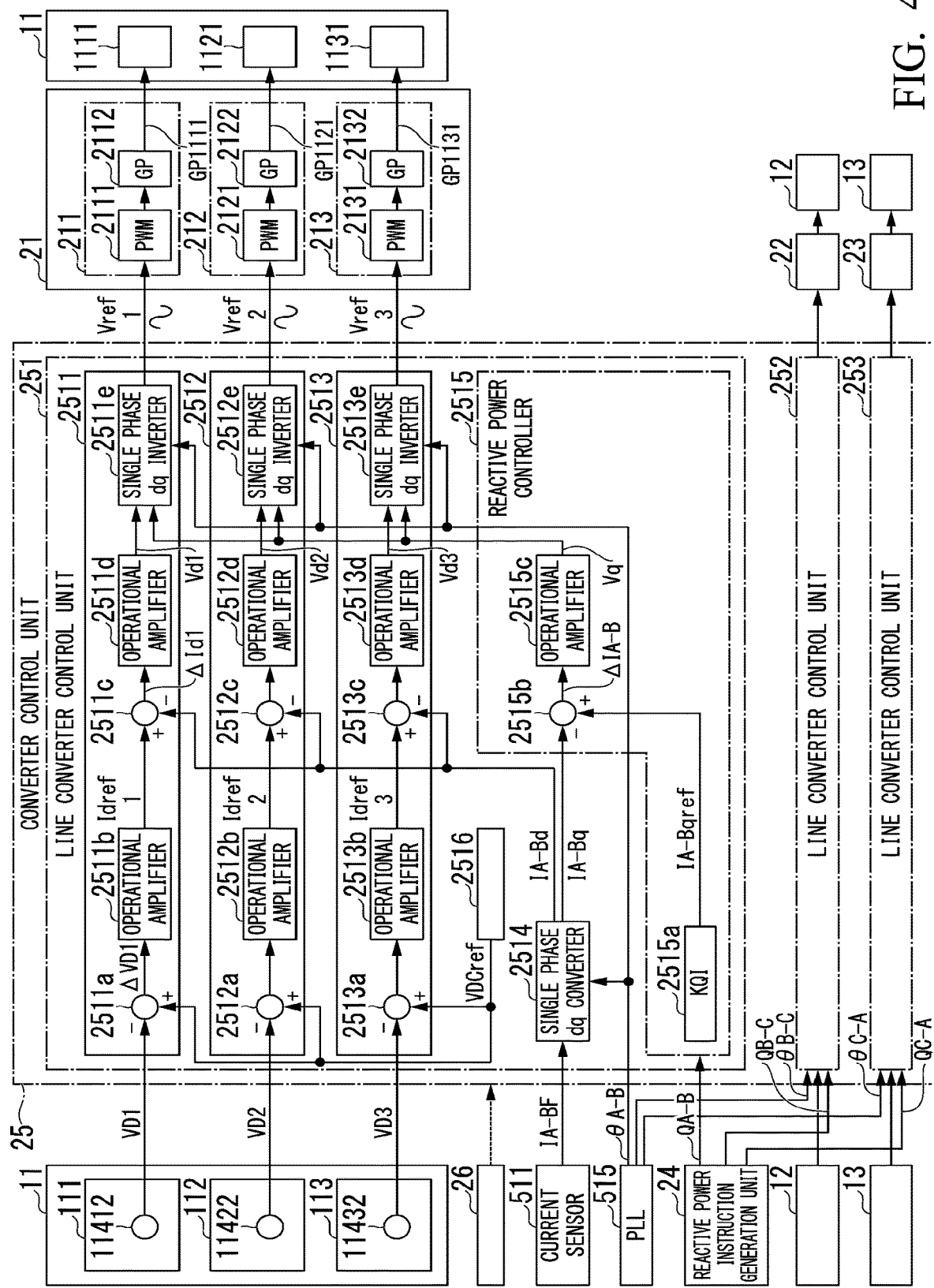
FIG. 4 is a configuration diagram of a converter control unit of an embodiment.

FIG. 4 is a configuration diagram of the converter control unit of the embodiment.

The line converter control unit 25 includes the line converter control units 251 to 253. The line converter control units 251 to 253 control the voltages of the capacitors provided to the DC links of each cell. Moreover, the line converter control units 251 to 253 adjust the reactive power flowing through each converter.

For example, the line converter control unit 251 controls the individual control unit 21 on the basis of the voltage of the DC link of each cell and the reactive power command value QA-B, thereby controlling the converters 1111, 1121, and 1131 connected to the line A-line B within the U-phase main circuit 11. Similarly, the line converter control unit 252 controls the individual control unit 22 on the basis of the voltage of the DC link of each cell and the reactive power command value QB-C, thereby controlling the converters 1211, 1221, and 1231 (FIG. 1) connected to the line B-line C within the V-phase main circuit 12. The line converter control unit 253 controls the individual control unit 23 on the basis of the voltage of the DC link of each cell and the reactive power command value QC-A, thereby controlling the converters 1311, 1321, and 1331 (FIG. 1) connected to the line C-line A within the W-phase main circuit 13. In addition, FIG. 4 does not illustrate each converter within the V-phase main circuit 12 and the W-phase main circuit 13.

Next, the control of the converters 1111, 1121, and 1131 will be described by exemplifying the line converter control unit 251.

The line converter control unit 251 includes reference wave generators 2511 to 2513, a single-phase dq converter 2514, a reactive power controller 2515, and a DC voltage reference generator 2516.

The reference wave generator 2511 generates a reference wave for controlling the corresponding converter 1111 on the basis of the DC voltage VD1 of the DC link of the corresponding converter 1111. The reference wave generator 2512 generates a reference wave for controlling the corresponding converter 1121 on the basis of the DC voltage VD2 of the DC link of the corresponding converter 1121. The reference wave generator 2513 generates a reference wave for controlling the corresponding converter 1131 on the basis of the DC voltage VD3 of the DC link of the corresponding converter 1131. The reference wave, for example, is a voltage waveform. Details of the reference wave generators 2511 to 2513 will be described below.

The single-phase dq converter 2514 performs single-phase dq conversion, in which the phase θ A-B supplied from the PLL 515 is employed as a reference phase, on a current IA-BF supplied from the current sensor 511, thereby calculating active current IA-Bd and reactive current IA-Bq. The single-phase dq conversion is coordinate conversion in which a single-phase AC indicated by a stationary coordinate system is converted into a rotating coordinate system having an axis d and an axis q. Here, an active current component flowing to the converter from the AC power supply system PS side is assigned in the direction of the axis d parallel to the line voltage direction corresponding to the input of the converter, and a reactive current component is assigned in the direction of the axis q perpendicular to the voltage direction.

The DC voltage reference generator 2516 generates a DC voltage reference VDCref. For example, the DC voltage reference generator 2516 may adjust the specified amount of the DC voltage reference VDCref on the basis of a command from the inverter control unit 26.

The reactive power controller 2515 calculates a q-axis voltage reference Vq on the basis of the reactive power command value QA-B supplied from the reactive power command value generation unit 24 and a reactive current feedback IA-Bq calculated by the single-phase dq converter 2514. The reactive power controller 2515 operates to flow a current with a phase difference of 90° with respect to an input voltage to each converter in correspondence to the reactive power command value QA-B.

For example, the reactive power controller 2515 includes an operational block 2515*a*, a subtractor 2515*b*, and an operational amplifier 2515*c*. The operational block 2515*a* calculates a reactive current reference 1A-Bref by multiplying the reactive current QA-B supplied from the reactive power command value generation unit 24 by a coefficient KQI. The coefficient KQI, for example, is a coefficient for converting a reactive power command into a current command. The value of the coefficient KQI is defined on the basis of the line voltage of the power supply system.

The subtractor 2515*b* calculates a reactive current error ΔIA-B by subtracting the reactive current feedback IA-Bq calculated by the single-phase dq converter 2514 from the reactive current reference IA-Bref.

The operational amplifier 2515*c* calculates a q-axis voltage reference Vq so that the reactive current feedback IA-Bq becomes equal to the reactive current reference IA-Bref, on the basis of the reactive current error ΔIA-B. The operational amplifier 2515*c* supplies the q-axis voltage reference Vq to the reference wave generators 2511 to 2513.

For example, the reference wave generator 2511 corresponding to the cell at the first stage includes a subtractor 2511*a*, an operational amplifier 2511*b*, a subtractor 2511*c*, an operational amplifier 2511*d*, and a single-phase dq inverter 2511*e*.

The subtractor 2511*a*, for example, employs the DC voltage reference VDCref supplied from the DC voltage reference generator 2516 as a control target value and calculates a DC voltage error ΔVD1 by subtracting the DC voltage VD1 of the DC link from the DC voltage reference VDCref. The operational amplifier 2511b calculates a d-axis current reference Idref1 on the basis of the DC voltage error ΔVD1 so that the DC voltage VD1 of the DC link becomes equal to the DC voltage reference VDCref. The subtractor 2511c calculates a d-axis current error ΔId1 by subtracting the active current 1A-Bd from the d-axis current reference Idref1. The operational amplifier 2511d calculates a d-axis voltage reference Vd1 on the basis of the d-axis current error ΔId1 so that the active current IA-Bd becomes equal to the d-axis current reference Idref1. The single-phase dq inverter 2511e performs single-phase dq inversion, in which the phase θ A-B supplied from the PLL 515 is employed as a reference phase, on the basis of the d-axis voltage reference Vd1 and the q-axis voltage reference Vq, thereby calculating a voltage reference signal vref1. The single-phase dq inversion is conversion reverse to the single-phase dq conversion. The reference wave generator 2511 supplies the voltage reference signal vref1 to the U-phase individual control unit 211. The voltage reference signal vref1 is used as a reference wave by the U-phase individual control unit 211 at the rear stage.

For example, the U-phase individual control unit 211 controlled by the reference wave generator 2511 includes a PWM controller 2111 (PWM in the drawing) and a gate pulse generator 2112 (GP in the drawing). The PWM controller 2111 supplies the gate pulse generator 2112 with a pulse subjected to PWM conversion on the basis of the voltage reference signal vref1 and a predetermined carrier signal. The gate pulse generator 2112 supplies the converter 1111 with a gate pulse GP1111 generated on the basis of the supplied pulse.

Similarly, the reference wave generator 2512 corresponding to the cell at the second stage includes a subtractor 2512a, an operational amplifier 2512b, a subtractor 2512c, an operational amplifier 2512d, and a single-phase dq inverter 2512e. The reference wave generator 2512 generates a voltage reference signal vref2 for controlling the converter 1121 on the basis of the DC voltage VD2 of the DC link of a corresponding converter. The reference wave generator 2512 supplies the voltage reference signal vref2 to the U-phase individual control unit 212.

The U-phase individual control unit 212 controlled by the reference wave generator 2512 includes a PWM controller 2121 and a gate pulse generator 2122. The U-phase individual control unit 212 is different from the U-phase individual control unit 211 in that a gate pulse GP1121 is generated on the basis of the voltage reference signal vref2 as a reference wave and is supplied to the converter 1121, but the other is equivalent to the aforementioned U-phase individual control unit 211.

Similarly, the reference wave generator 2513 corresponding to the cell at the third stage includes a subtractor 2513a, an operational amplifier 2513b, a subtractor 2513c, an operational amplifier 2513d, and a single-phase dq inverter 2513e. The reference wave generator 2513 generates a voltage reference signal vref3 for controlling the converter 1131 on the basis of the DC voltage VD3 of the DC link of a corresponding converter. The reference wave generator 2513 supplies the voltage reference signal vref3 to the U-phase individual control unit 213.

The U-phase individual control unit 213 controlled by the reference wave generator 2513 includes a PWM controller 2131 and a gate pulse generator 2132. The U-phase individual control unit 213 is different from the U-phase individual control unit 211 in that a gate pulse GP1131 is generated on the basis of the voltage reference signal vref3 as a reference wave and is supplied to the converter 1131, but the other is equivalent to the aforementioned U-phase individual control unit 211.

In an actual device, since the voltages of the DC links in the cells are different from one another, the DC voltage VD1, the DC voltage VD2, and the DC voltage VD3 are different from one another. Thus, the d-axis current reference Idref1, the d-axis current reference Idref2, and the d-axis current reference Idref3 have values different from one another and the d-axis voltage reference Vd1, the d-axis voltage reference Vd2, and the d-axis voltage reference Vd3 have values different from one another, so that the voltage reference signal vref1, the voltage reference signal vref2, and the voltage reference signal vref3 finally have values different from one another. As described above, since the states of the cells are different from one another, the individual control units for individually controlling the cells operate independently for each cell.

The line converter control unit 25 illustrated in FIG. 4 controls the phase of the reactive current such that a current with a phase advanced from the input voltage of the converter by 90° flows when the reactive power command QA-B is positive (+) and a current with a phase delayed by 90° flows when the reactive power command QA-B is negative (−).

More specifically, the line converter control unit 25 controls the converter to output an AC voltage slightly higher than the voltage of the AC power supply system PS when outputting the capacitive reactive power. When the inductive reactive power is output, the line converter control unit 25 controls the converter to output a voltage slightly lower than the voltage of the AC power supply system PS.

Even though the active power output from the output terminals TU, TV, and TW is imbalanced among the three phases, the power conversion device 1 can receive balanced active power from the AC power supply system PS by the following control.

Figure 5:
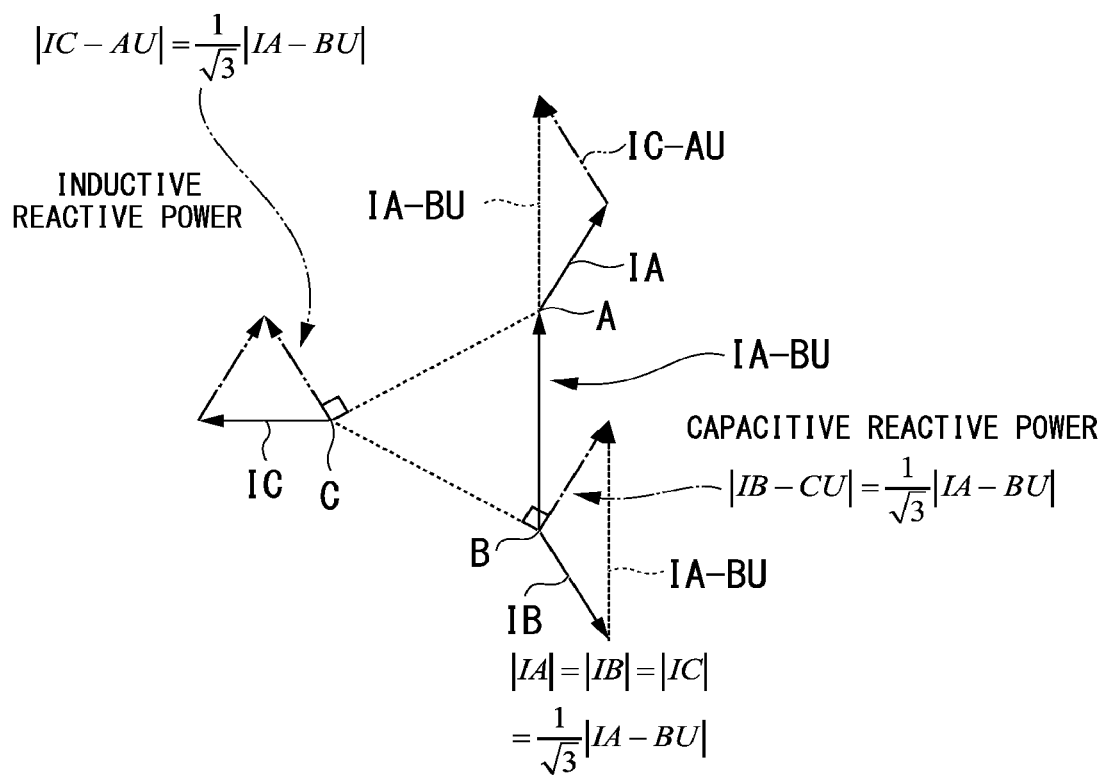
FIG. 5 is a vector diagram for explaining the control of a converter of an embodiment.

With reference to FIG. 1 and FIG. 5, the control of each converter of the embodiment will be described.

FIG. 5 is a vector diagram for explaining the control of the converter of the embodiment. The following operation is a vector operation.

In the following description, in order to simplify the description, it is assumed that conversion loss in the power conversion device 1 is small and the active power on the output side of the power conversion device 1 and the active power supplied from the AC power supply system PS side are approximately equal to each other. When actually applied to the power conversion device 1, in consideration of the conversion loss due to the power conversion device 1, the active power of the power conversion device 1 on the AC power supply system PS side may be defined to be slightly larger than the active power of the output side.

As illustrated in FIG. 1, it is assumed that the active power Puact is supplied from the U phase to the motor 2 in the three-phase AC output. The active power Puact is supplied by the cell connected to the output terminal U phase and to the line A-line B on the AC power supply system PS side. At this time, the converters 1111, 1121, and 1131 operate, so that the current IA-BU corresponding to the active power Puact flows to the primary windings of the transformers 1113, 1123, and 1133 on the AC power supply system PS side. This current is a line current IA-BU.

It is assumed that the active power Puact actually supplied is equal to the active power Pu arithmetically obtained. Furthermore, the amount of the (A-B) line-to-line voltage on the AC power supply system PS side is set as VLL. The amount of the current IA-BU can be obtained by dividing the active power Pu by the line voltage VLL. This relation is expressed by Equation 1 below.

$$|IA-BU|=Pu/VLL \qquad (1)$$

Since the current IA-BU is a current flowing in a direction in which the active power is supplied to the motor 2, the direction of the vector of the line current IA-BU is the same as the direction of the vector of the (A-B) line-to-line voltage as illustrated in FIG. 5. In such a case, the power conversion device 1 controls the converter of the cell, which is connected to the line B-line C, to flow the current IB-CU with an amount, which is obtained by multiplying the amount of IA-BU by $1/\sqrt{3}$.

However, the current vector of IB-CU is set to be perpendicular to the direction of the (B-C) line-to-line voltage. The direction of the current vector is set to be a direction advanced by 90° with respect to the (B-C) line-to-line voltage such that the reactive power due to the current and the (B-C) line-to-line voltage is capacitive. In such a case, for example, the line converter control unit 252 of the power conversion device 1 controls the line current TB-CU with the amount of $1/\sqrt{3}$ and the capacitive reactive power to be output.

Moreover, in order for the power conversion device 1 to flow the current IC-AU with an amount obtained by multiplying the amount of IA-BU by $1/\sqrt{3}$, the controller 20 controls the converters 1311, 1321, and 1331 of the cells connected to the line C-line A. However, the direction of the current vector of the line current IC-AU is perpendicular to the direction of the vector of the (C-A) line-to-line voltage. The controller 20 sets the direction of the current vector to be a direction delayed by 90° with respect to the (C-A) line-to-line voltage such that the reactive power due to the current and the (B-C) line-to-line voltage is inductive. In such a case, for example, the line converter control unit 253 of the power conversion device 1 controls the line current IC-AU with the amount of $1/\sqrt{3}$ and the inductive reactive power to be output.

Since the converter of each cell in the power conversion device 1 is a voltage-type self-excited converter, the power conversion device 1 can control the reactive power independently of the active power within the range of the rated capacity of the converter. Therefore, even though the active power between the input terminals TB and TC or TC and TA is tentatively zero, it is possible to control the reactive power between the input terminals TB and TC or TC and TA.

Furthermore, the current (the phase current) of each phase of the AC power supply system PS can be obtained by the following vector operation (subtraction) based on the measured value of the line current.

First, an A-phase current IA can be expressed using two vectors (IA-BU) and (IC-AU). The A-phase current IA is (IA-BU)-(IC-AU) as a result of the vector subtraction. The two vectors constitute two sides of an isosceles triangle with a vertex angle of 120°, which is illustrated in FIG. 5. The direction of the A-phase current IA as a result of the subtraction of the two vectors becomes a vector inclined by 30° in a delayed direction with respect to the direction of the (A-B) line-to-line voltage, and is the same direction as that of the phase voltage of the phase A of the AC power supply system PS.

Moreover, since the A-phase current IA and the line current IC-AU constitute two sides having the same lengths of the isosceles triangle, the amount of the A-phase current IA is equal to the amount of the line current IC-AU and corresponds to $1/\sqrt{3}$ of the amount of the line current IA-BU.

Since the directions of the phase voltage and the phase current are the same as each other, power obtained by multiplying the current and the voltage is all active power. Moreover, since the amount of the phase voltage VA corresponds to $1/\sqrt{3}$ of the amount of the line-to-line voltage and the amount of the A-phase current IA also corresponds to $1/\sqrt{3}$, the active power of the phase A of the AC power supply system PS corresponds to ⅓ (one-third) of the active power Pu of the output terminal TU (Phase U).

Similarly to the case of the phase A, a B-phase current IB is ((IB-CU)-(IA-BU)). The B-phase current IB can be defined using a relation between the vector operation (subtraction) illustrated in FIG. 5 and the isosceles triangle. The direction of the B-phase current IB is the same direction as that of the phase voltage VB of the phase B of the AC power supply system PS, and the amount of the B-phase current IB corresponds to $1/\sqrt{3}$ of the amount of the line current IA-BU. Furthermore, the active power of the phase B of the AC power supply system PS corresponds to ⅓ (one-third) of the active power Pu of the output terminal TU (Phase U), similarly to the phase A.

Similarly to the case of the phase A, a C-phase current IC is ((IC-AU)-(IB-CU)). As illustrated in FIG. 5, the two vectors constitute two sides of a regular triangle. Consequently, as illustrated in FIG. 5, the direction of IC is the same as that of the voltage VC of the phase C of the AC power supply system PS, and the amount of IC is equal to those of the line current IC-AU and the line current IB-CU. That is, the amount of IC corresponds to $1/\sqrt{3}$ of the amount of IA-BU. Consequently, the active power of the phase C of the AC power supply system PS corresponds to ⅓ (one-third) of the active power Pu of the output terminal TU (Phase U), similarly to the phase A and the phase B.

As described above, since the amounts of the currents of the phases of the AC power supply system PS become equal to one another and the directions of the currents of the phases become equal to the directions of the phase voltages, a power factor is 1 when viewed from the AC power supply system and only the active power is supplied. Moreover, the active power of each phase of the AC power supply system PS corresponds to ⅓ (one-third) of the active power Pu of the output terminal and the three phases of the active power are balanced.

Although not illustrated in the drawing, even when the active power is output from the V-phase and W-phase output terminals, the same effect as in the case of the phase U is obtained as will be described below.

For example, it is assumed that the active power Pvact is output from the output terminal TV (phase V) and the active power Pv is acquired by the active power acquisition unit 32 at that time. When the active power Pvact and the active power Pv are equal to each other, the amount of the line current IB-CV for supplying the active power Pvact is $|IB-CV|=Pv/VLL$. The line converter control unit 253 of the power conversion device 1 controls the line current IC-AV with the amount of $1/\sqrt{3}$ and the capacitive reactive power to be output. Furthermore, the line converter control unit 251 of the power conversion device 1 controls the current IA-BV with the same amount and the inductive reactive power to be output.

It is assumed that the active power Pwact is output from the output terminal TW (phase W) and the active power Pw is acquired by the active power acquisition unit 32 at that time. When the active power Pwact and the active power Pw are equal to each other, the amount of the line current IC-AW for supplying the active power Pwact is $|IC-AW|=Pw/VLL$. The line converter control unit 251 of the power conversion device 1 controls the line current IA-BW with the amount of $1/\sqrt{3}$ and the capacitive reactive power to be output. Furthermore, the line converter control unit 252 of the power conversion device 1 controls the current IB-CW with the same amount and the inductive reactive power to be output.

By performing the aforementioned control, in all the cases, since the amounts of the currents of the phases of the AC power supply system PS become equal to one another and the directions of the currents of the phases become equal to the directions of the phase voltages, only active power with the power factor of 1 is obtained, similarly to the description for the output terminal TU (Phase U). Moreover, the active power of each phase corresponds to ⅓ (one-third) of the active power of the output terminal, so that the three phases are balanced.

When the active power Puact, the active power Pvact, and the active power Pwact are simultaneously output from the output terminals TU, TV, and TW, reactive power obtained by the following operation is output from each line on the AC power supply system PS side by using a principle of superposition, so that the active power of each phase of the AC power supply system PS side is (Pu+Pv+Pw)/3 and thus can be balanced.

The following Equation 2 indicates each line current. In Equation 2 below, the sign of + represents a current corresponding to capacitive reactive power and the sign of − represents a current corresponding to inductive reactive power.

$(A\text{-}B)$ line current $IA\text{-}B=(|IB\text{-}CV|-|IC\text{-}AW|)/\sqrt{3}$ $(B\text{-}C)$ line current $IB\text{-}C=(|IC\text{-}AW|-|IA\text{-}BU|)/\sqrt{3}$ $(C\text{-}A)$ line current $IC\text{-}A=(|IA\text{-}BU|-|IB\text{-}CV|)/\sqrt{3}$ (2)

Since the line reactive power can be obtained by multiplying the line current by the line voltage, the amount of each line reactive power is expressed by the following Equation 3.

$(A\text{-}B)$ line reactive power $QA\text{-}B=(|IB\text{-}CV|-|IC\text{-}AW|)/\sqrt{3}\times VLL=(Pv-Pw)/\sqrt{3}$ $(B\text{-}C)$ line reactive power $QB\text{-}C=(|IC\text{-}AW|-|IA\text{-}BU|)/\sqrt{3}\times VLL=(Pw-Pu)/\sqrt{3}$ $(C\text{-}A)$ line reactive power $QC\text{-}A=(|IA\text{-}BU|-|IB\text{-}CV|)/\sqrt{3}\times VLL=(Pu-Pv)/\sqrt{3}$ (3)

Consequently, as illustrated in FIG. 3, the reactive power command value generation unit 24 can calculate the reactive power command value for defining the reactive power on the AC power supply system PS side from the measured values Pu, Pv, and Pw of the active power Puact, Pvact, and Pwact of the output terminals of the power conversion device 1.

In addition, when the active power Puact, Pvact, and Pwact output from the output terminals TU, TV, and TW is balanced, reactive power for balancing the active power Puact, Pvact, and Pwact on the AC power supply system PS side may be zero. The value derived from Equation 3 above also becomes zero. The result of the geometric analysis using the aforementioned vectors and the numerical analysis result of Equation 3 above are matched with each other.

According to the aforementioned embodiment, the single-phase AC conversion units 111 to 113, which have the input terminals connected to the line A-line B between the phase A and the phase B of the first three-phase AC on the AC power supply system PS side, the single-phase AC conversion units 121 to 123, which are connected to the line B-line C between the phase B and the phase C of the first three-phase AC, and the single-phase AC conversion units 131 to 133, which are connected to the line C-line A between the phase C and the phase A of the first three-phase AC, form a delta-connected load for the AC power supply system PS. At least the single-phase AC conversion units 111 to 113 form a first set in which respective output terminals are connected in series one another. The single-phase AC conversion units 121 to 123 form a second set in which respective output terminals are connected in series one another. The single-phase AC conversion units 131 to 133 form a third set in which respective output terminals are connected in series one another. The first set and the second set and the third set, which are different from the first set, form each phase of a star connected power supply.

In the controller 20, the active power acquisition units 31 to 33 acquire the values related to the active power supplied to the load side from the output of the second three-phase AC on the motor side. The reactive power command value generation unit 24 generates a reactive power command value for designating reactive power, which is output from the AC power input terminals TA, TB, and TC to the AC power supply system PS, on the basis of the values related to the active power acquired by the active power acquisition units 31 to 33. The reactive power command value generation unit 24 controls the reactive power of a converter to which the reactive power command value is supplied. In this way, the power conversion device 1 can reduce the influence of unbalance among the phases of the active power supplied to the load side of the power conversion device 1 to the AC power supply system PS side.

First Modification Example of First Embodiment

A first modification example of the first embodiment will be described.

In the first embodiment, an example of control based on the active power of the output terminals of the power conversion device 1 has been described. In the present modification example, instead of this, an example, in which active power is calculated on the basis of DC power transmitted via the DC link of each cell and control is performed on the basis of the active power, will be described.

Figure 6:
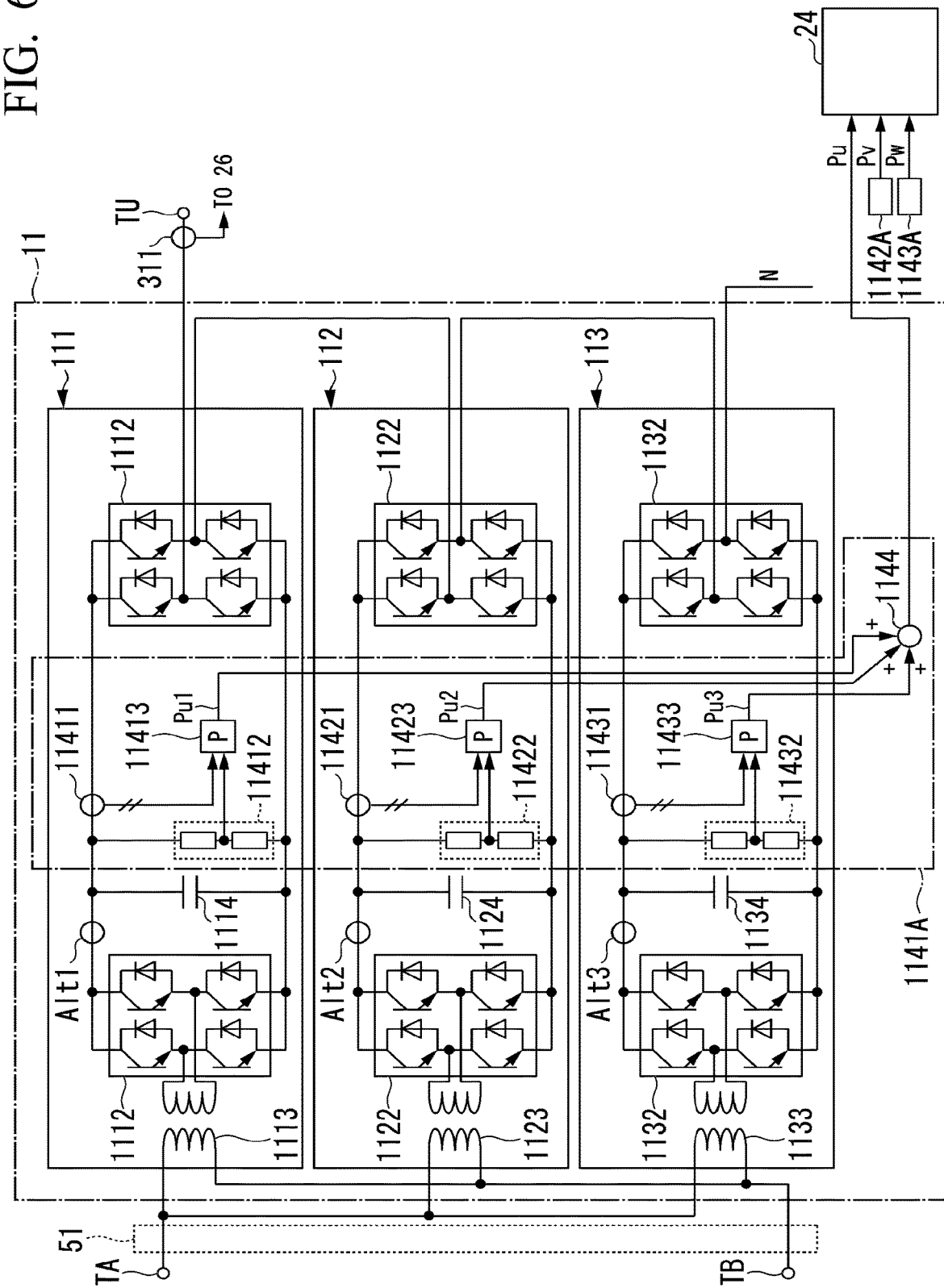
FIG. 6 is a diagram for explaining the calculation of active power of a first modification example of a first embodiment.

FIG. 6 is a diagram for explaining the calculation of the active power of the first modification example of the first embodiment. The range illustrated in FIG. 6 relates to the output terminal TU (phase U).

The power conversion device 1 of the aforementioned first embodiment includes the active power calculation units 313, 323, and 333, but, instead of this, the power conversion device 1 of the modification example includes current voltage detection circuits 1141A to 1143A. The current voltage detection circuits 1141A to 1143A are an example of active power calculation units.

The current voltage detection circuit 1141A includes current sensors 11411, 11421, and 11431, active power calculation units 11413, 11423, and 11433, and an adder 1144 (addition unit).

The current sensor 11411 detects a current flowing through the DC link of the single-phase AC conversion unit 111. The current sensor 11411 and the voltage sensor 11412 output detection results to the active power calculation unit 11413. The active power calculation unit 11413 calculates power converted by the single-phase AC conversion unit 111, on the basis of the DC voltage detected by the voltage sensor 11412 and the DC current detected by the current sensor 11411, and sets the calculated power as active power Pu1.

The current sensor 11421 detects a current flowing through the DC link of the single-phase AC conversion unit 112. The current sensor 11421 and the voltage sensor 11422 output detection results to the active power calculation unit 11423. The active power calculation unit 11423 calculates power converted by the single-phase AC conversion unit 112, on the basis of the DC voltage detected by the voltage sensor 11422 and the DC current detected by the current sensor 11421, and sets the calculated power as active power Pu2.

The current sensor 11431 detects a current flowing through the DC link of the single-phase AC conversion unit 113. The current sensor 11431 and the voltage sensor 11432 output detection results to the active power calculation unit 11433. The active power calculation unit 11433 calculates power converted by the single-phase AC conversion unit 113, on the basis of the DC voltage detected by the voltage sensor 11432 and the DC current detected by the current sensor 11431, and sets the calculated power as active power Pu3.

For example, the current sensor 11411 is provided at a position on the inverter 1112 side from a contact point, at which the capacitor 1114 is connected to the DC link, in the DC link of the single-phase AC conversion unit 111. In such a case, the current sensor 11411 measures a DC current flowing from the capacitor 1114 to the inverter 1112. The current sensor 11421 and the current sensor 11431 are also the same as the current sensor 11411.

The adder 1144 adds the active power Pu1, the active power Pu2, and the active power Pu3, and outputs the addition sum as the active power Pu of the output terminal.

Also in the cases of the output terminal TV (phase V) and the output terminal TW (phase W), the current voltage detection circuit 1142A calculates the active power Pv of the output terminal TV, similarly to the case of the output terminal TU (phase U). The current voltage detection circuit 1143A calculates the active power Pw of the output terminal TW. The reactive power command value generation unit 24 generates the reactive power command values QA-B, QB-C, and QC-A (FIG. 1) on the basis of the active power Pu, Pv, and Pw.

According to the modification example, even when the active power Pu, Pv, and Pw of the output terminals are calculated from the power measurement values sent by the DC links, the same effect as that in the first embodiment is obtained.

In addition, the arrangement positions of the current sensor 11411, the current sensor 11421, and the current sensor 11431 are not limited to the positions illustrated in FIG. 6, and the current sensor 11411 may be arranged at a position Alt1, the current sensor 11421 may be arranged at a position Alt2, and the current sensor 11431 may be arranged at a position Alt3.

For example, the position Ala in the DC link of the U-phase main circuit 11 is a position on the converter 1111 from the contact point at which the capacitor 1114 is connected to the DC link. In such a case, the current sensor 11411 measures a DC current flowing from the converter 1111 to the capacitor 1114. The current sensor 11421 and the current sensor 11431 are also the same as the current sensor 11411.

Second Modification Example of First Embodiment

A second modification example of the first embodiment will be described. The present modification example is different from the embodiment in terms of an active power calculation method, similarly to the first modification example. Hereinafter, a description will be given for an example in which active power is calculated on the basis of a line voltage and a line current of each cell on the AC power supply system PS side and control is performed on the basis of the active power.

Figure 7:
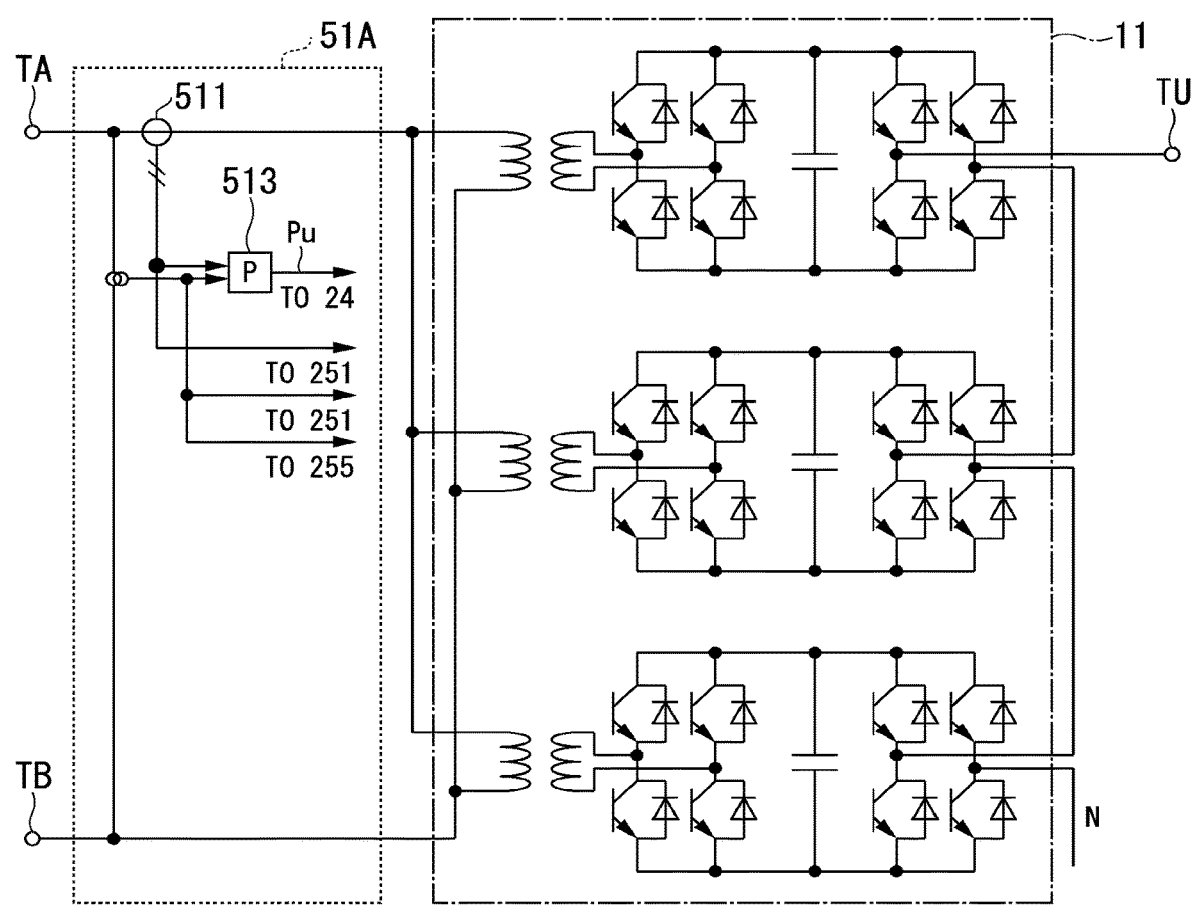
FIG. 7 is a diagram for explaining the calculation of active power of a second modification example of a first embodiment.

FIG. 7 is a diagram for explaining the calculation of the active power of the second modification example of the first embodiment.

A current voltage detection circuit 51A illustrated in FIG. 7 further includes at least an active power calculation unit 513 with respect to the aforementioned current voltage detection circuit 51. The active power calculation unit 513 replaces the aforementioned active power calculation unit 313.

In the present modification example, for example, a current sensor 511, a voltage sensor 512, and the active power calculation unit 513 are used instead of the current sensor 311, the voltage sensor 312, and the active power calculation unit 313 illustrated in FIG. 1. The active power calculation unit 513 is added to the output destinations of the voltage sensor 512 and the current sensor 511.

The current voltage detection circuit 51A is an example of the active power acquisition unit that is applied to the U-phase main circuit 11. For the V-phase main circuit 12 and the W-phase main circuit 13, the current voltage detection circuits 52 and 53 may be changed to current voltage detection circuits 52A and 53A, similarly to the current voltage detection circuit 51A that is applied to the U-phase main circuit 11.

According to the present modification example, active power toward the motor 2 from the AC power supply system PS can be calculated on the basis of a line voltage and a line current on the AC power supply system PS side. As described above, even when the active power measurement position is replaced, the same effect as that in the first embodiment is obtained.

Second Embodiment

A second embodiment will be described.

The first embodiment has described an example in which power (active power) is calculated on the basis of the measured values of the voltage and the current in the power conversion device 1 and control is performed on the basis of the calculated power (active power). In the present modification example, instead of this, an example, in which estimated power is calculated using a voltage reference for controlling an inverter as a voltage and control is performed on the basis of the estimated power, will be described.

Figure 8:
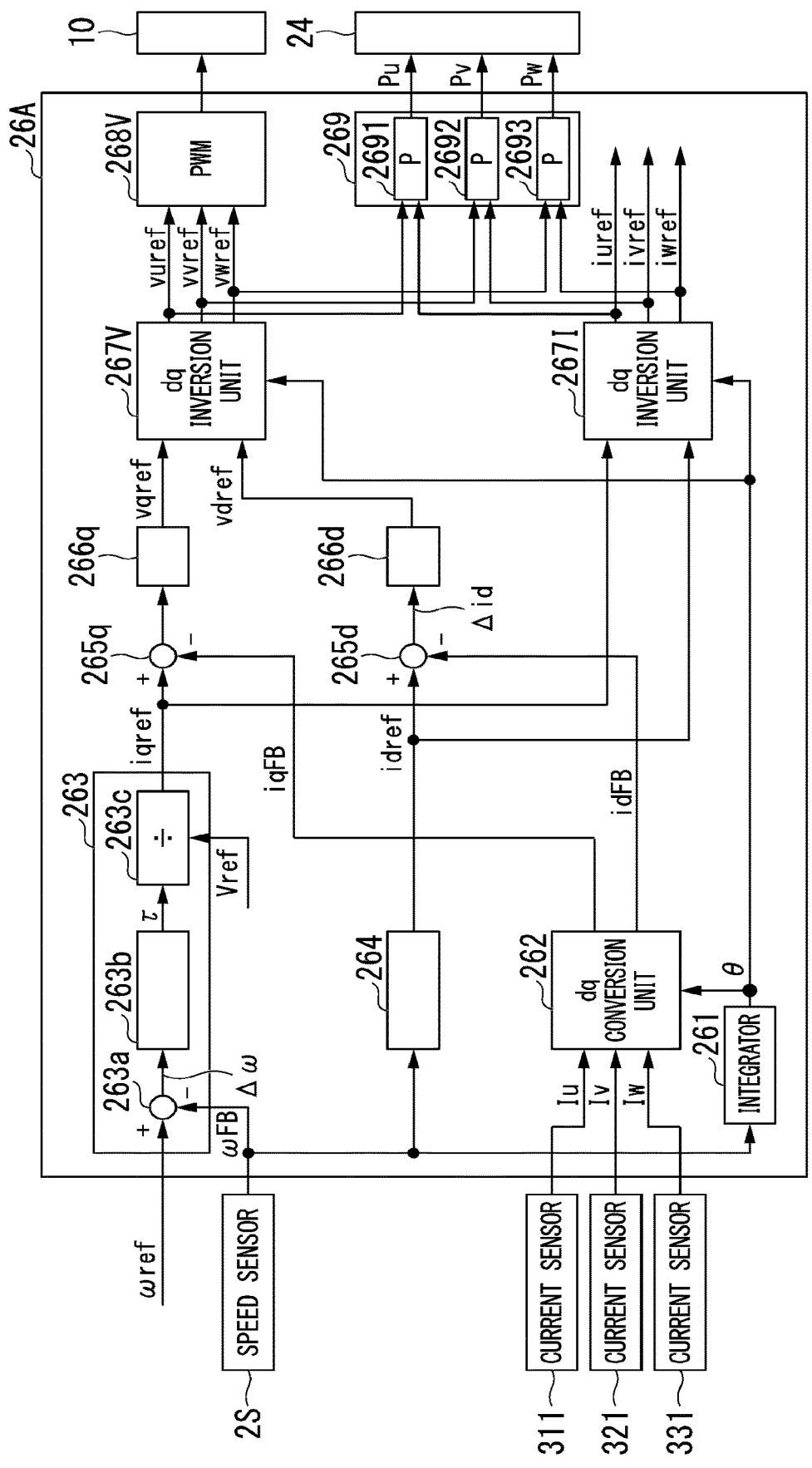
FIG. 8 is a configuration diagram of an inverter control unit of a second embodiment.

FIG. 8 is a configuration diagram of an inverter control unit 26A of the embodiment.

The inverter control unit 26A, for example, includes an integrator 261, a dq conversion unit 262, a q-axis current reference generator 263, a d-axis current reference generator 264, a subtractor $265q$, a q-axis current adjuster $266q$, a subtractor $265d$, a d-axis current adjuster $266d$, a dq inversion unit 267V, and a PWM controller 268V.

The above corresponds to the configuration of the inverter control unit 26.

The inverter control unit 26A further includes a dq inversion unit 2671 and an active power calculation unit 269.

First, a configuration common to the inverter control unit 26 will be described.

The integrator 261 generates a phase θ by integrating a speed feedback value coFB.

The dq conversion unit 262 converts the output currents Iu, Iv, and Iw supplied from the current sensors 311, 321, and 331 into a rotating coordinate system (dq-axis coordinate system) rotated by the phase θ with respect to the u-axis of a uvw-axis stationary coordinate system. The dq conversion unit 262 outputs a q-axis current feedback value iqFB and a d-axis current feedback value idFB.

The q-axis current reference generator 263 generates a q-axis current reference iqref, which is a torque current of the motor 2, on the basis of a speed reference wref, the speed feedback value ωFB, and a voltage reference Vref. The speed reference wref is a target value of the rotating speed of the motor 2 and its value is designated from a higher-level device. The voltage reference Vref defines a voltage level output by an inverter. The voltage reference Vref may have a value designated from a higher-level device or a predetermined specified value.

For example, the q-axis current reference generator 263 includes a subtractor 263a, a speed adjuster 263b, and a divider 263c. The subtractor 263a calculates a speed error Δω by subtracting the speed feedback value ωFB output from a speed sensor 2S from the speed reference wref. The speed adjuster 263b calculates a required torque reference τ by a PI operation based on the speed error Δω. The divider 263c divides the required torque reference τ by the voltage reference Vref, and outputs the quotient as the q-axis current reference iqref.

The subtractor 265q calculates a q-axis current error Δiq by subtracting the q-axis current feedback value iqFB from the q-axis current reference iqref. The q-axis current adjuster 266q calculates a q-axis voltage reference vqref by a PT operation based on the q-axis current error Δiq.

The d-axis current reference generator 264 generates a d-axis current reference idref by a predetermined operation based on the speed feedback value ωFB.

The subtractor 265d calculates a d-axis current error Δid by subtracting the d-axis current feedback value idFB from the d-axis current reference idref. The d-axis current adjuster 266d calculates a d-axis voltage reference vdref by a PI operation based on the d-axis current error Δid.

The dq inversion unit 267V performs dq inversion, in which the phase θ is employed as a reference phase, on the q-axis voltage reference vqref and the d-axis voltage reference vdref. The dq inversion is conversion reverse to the dq conversion of the dq conversion unit 262. The dq inversion unit 267V calculates inverter voltage references vuref, vvref, and vwref by the dq inversion. The inverter voltage references vuref, vvref, and vwref are an example of voltage reference signals in inverter control.

The PWM controller 268V, for example, performs PWM conversion on the inverter voltage references vuref, vvref, and vwref on the basis of a predetermined carrier signal, and supplies each inverter with a gate pulse generated by the PWM conversion.

For example, the PWM controller 268V supplies the inverters 1112, 1122, and 1132 (FIG. 1) in the AC conversion unit main circuit 10 with the gate pulse generated by the PWM conversion based on the inverter voltage reference vuref. The PWM controller 268V supplies the inverters 1212, 1222, and 1232 (FIG. 1) in the AC conversion unit main circuit 10 with the gate pulse generated by the PWM conversion based on the inverter voltage reference vvref. The PWM controller 268V supplies the inverters 1312, 1322, and 1332 (FIG. 1) in the AC conversion unit main circuit 10 with the gate pulse generated by the PWM conversion based on the inverter voltage reference vwref.

The inverter control unit 26A controls the aforementioned each inverter by the voltage-controlled PWM control based on the inverter voltage reference vwref.

The above is the configuration common to the aforementioned inverter control unit 26.

The inverter control unit 26A calculates the estimated values of active power Pu, Pv, and Pw by using the following configuration.

The dq inversion unit 2671 performs the dq inversion, in which the phase θ is employed as the reference phase, on the q-axis current reference iqref and the d-axis current reference idref. The dq inversion unit 2671 calculates inverter current references iuref, ivref, and iwref by the dq inversion.

The active power calculation unit 269 calculates the active power Pu, Pv, and Pw on the basis of the inverter voltage references vuref, vvref, and vwref calculated by the dq inversion unit 267V and the inverter current references iuref, ivref, and iwref calculated by the dq inversion unit 2671.

For example, the active power calculation unit 269 includes multipliers 2691 to 2693. The multiplier 2691 calculates the active power Pu by multiplying the inverter voltage reference vuref and the inverter current reference iuref. The multiplier 2692 calculates the active power Pv by multiplying the inverter voltage reference vvref and the inverter current reference ivref. The multiplier 2693 calculates the active power Pw by multiplying the inverter voltage reference vwref and the inverter current reference iwref.

The active power calculation unit 269 supplies the calculated active power Pu, Pv, and Pw to the reactive power command value generation unit 24.

According to the above, the inverter control unit 26A generates the q-axis current reference iqref by standardizing the result of the speed control based on the speed reference wref and the speed feedback value ωFB on the basis of the voltage reference Vref. The inverter control unit 26A generates the d-axis current reference idref on the basis of the speed feedback value ωFB. Moreover, the inverter control unit 26A performs the current control based on the q-axis current reference iqref, the d-axis current reference idref, and the U, V, and W-phase output currents Iu, Iv, and Iw as feedback signals. The inverter control unit 26A controls the inverters of the AC conversion unit main circuit 10 by the gate pulses generated on the basis of the result of the current control.

As described above, the inverter control unit 26A obtains the inverter voltage references vuref, vvref, and vwref that define the output voltages of the three-phase inverters for use in the PWM control. Moreover, the inverter control unit 26A obtains the inverter current references iuref, ivref, and iwref having estimated the output currents of the three-phase inverters in order to obtain the estimated values of the active power. Since the voltages and the currents of each inverter in the actual AC conversion unit main circuit 10 are controlled to follow the inverter voltage references vuref, vvref, and vwref and the inverter current references iuref, ivref, and iwref, the active power of the inverter of each phase can be calculated from these signals. As described above, the inverter control unit 26A can calculate the active power Pu, Pv, and Pw without using voltage measurement values.

Third Embodiment

A third embodiment will be described.

The first embodiment has described an example in which the transformer, the converter, and the inverter are arranged in this order in each of a plurality of cells of the power conversion device 1 from the AC power supply system PS side and the primary winding of the transformer is delta-connected. In the present modification example, a description will be given for an example in which an arrangement order is changed by applying an insulation type DC/DC converter (indirect DC converter) to the main circuit of the cell.

Figure 9:
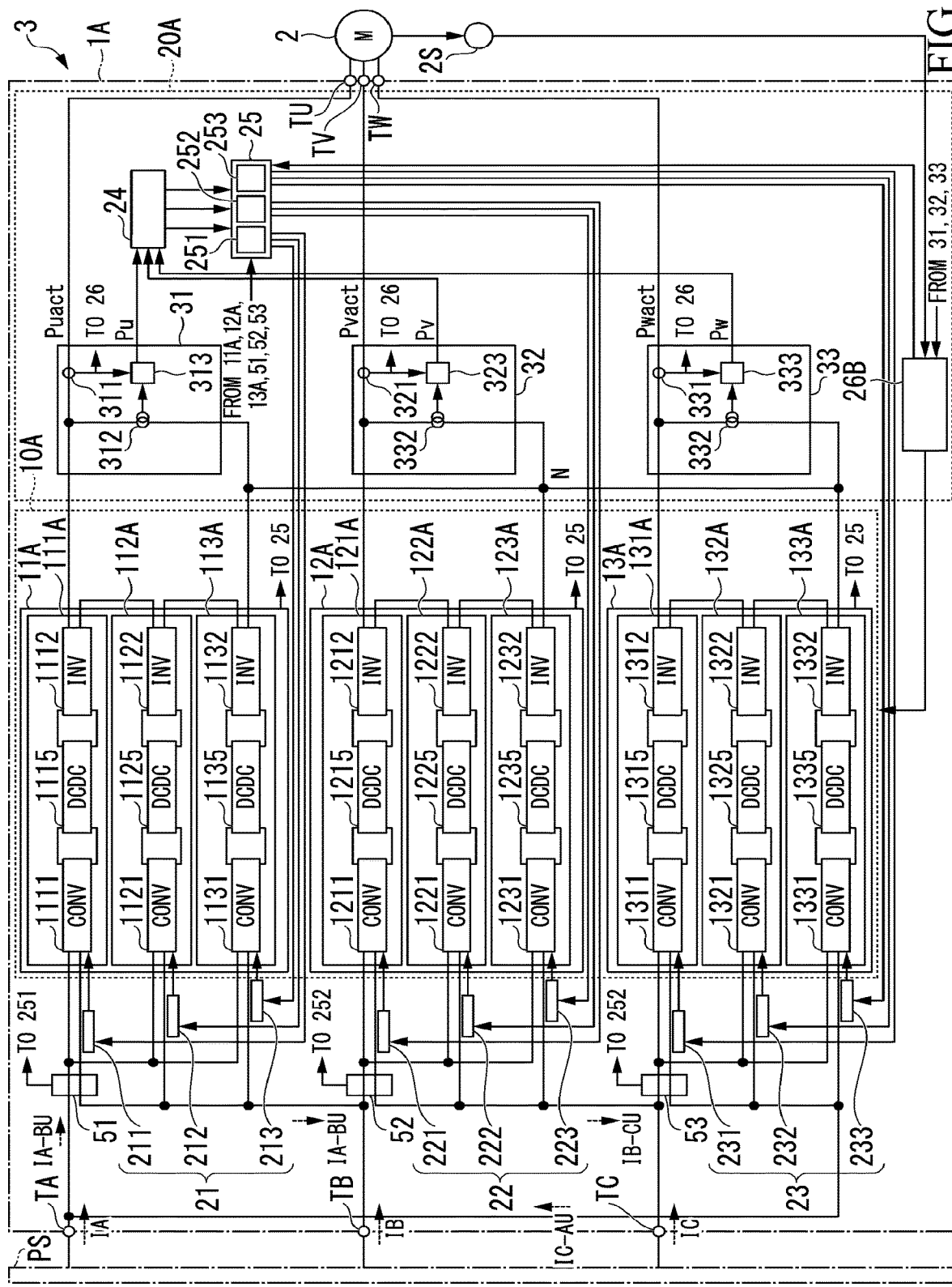
FIG. 9 is a configuration diagram of a power conversion device of a third embodiment.

FIG. 9 illustrates an example of a main circuit configuration of a power conversion device 1A in the embodiment. FIG. 9 is a configuration diagram of the power conversion device 1A in the embodiment.

The power conversion device 1A, for example, includes an AC conversion unit main circuit 10A and a controller 20A instead of the AC conversion unit main circuit 10 and the controller 20.

The AC conversion unit main circuit 10A, for example, includes a U-phase main circuit 11A, a V-phase main circuit 12A, and a W-phase main circuit 13A. The U-phase main circuit 11A includes single-phase AC conversion units 111A to 113A. The V-phase main circuit 12A, for example, includes single-phase AC conversion units 121A to 123A. The W-phase main circuit 13A, for example, includes single-phase AC conversion units 131A to 133A. The single-phase AC conversion units 111A to 113A, 121A to 123A, and 131A to 133A are an example of cells formed equivalently and correspond to the aforementioned single-phase AC conversion unit 100. These are collectively referred to as a single-phase AC conversion unit 100A.

The U-phase main circuit 11A, the V-phase main circuit 12A, and the W-phase main circuit 13A correspond to the U-phase main circuit 11, the V-phase main circuit 12, and the W-phase main circuit 13, respectively.

For example, in the U-phase main circuit 11A, the single-phase AC conversion unit 111A includes a DC/DC converter 1115 instead of the transformer 1113 of the single-phase AC conversion unit 111. Similarly, the single-phase AC conversion unit 112A includes a DC/DC converter 1125 instead of the transformer 1123. The single-phase AC conversion unit 113A includes a DC/DC converter 1135 instead of the transformer 1133.

In the V-phase main circuit 12A, the single-phase AC conversion unit 121A includes a DC/DC converter 1215 instead of the transformer 1213 of the single-phase AC conversion unit 121. Similarly, the single-phase AC conversion unit 122A includes a DC/DC converter 1225 instead of the transformer 1223. The single-phase AC conversion unit 123A includes a DC/DC converter 1235 instead of the transformer 1233.

In the W-phase main circuit 13A, the single-phase AC conversion unit 131A includes a DC/DC converter 1315 instead of the transformer 1313 of the single-phase AC conversion unit 131. Similarly, the single-phase AC conversion unit 132A includes a DC/DC converter 1325 instead of the transformer 1323. The single-phase AC conversion unit 133A includes a DC/DC converter 1335 instead of the transformer 1333.

The controller 20A includes an inverter control unit 26B instead of the inverter control unit 26 of the aforementioned controller 20.

Figure 10:
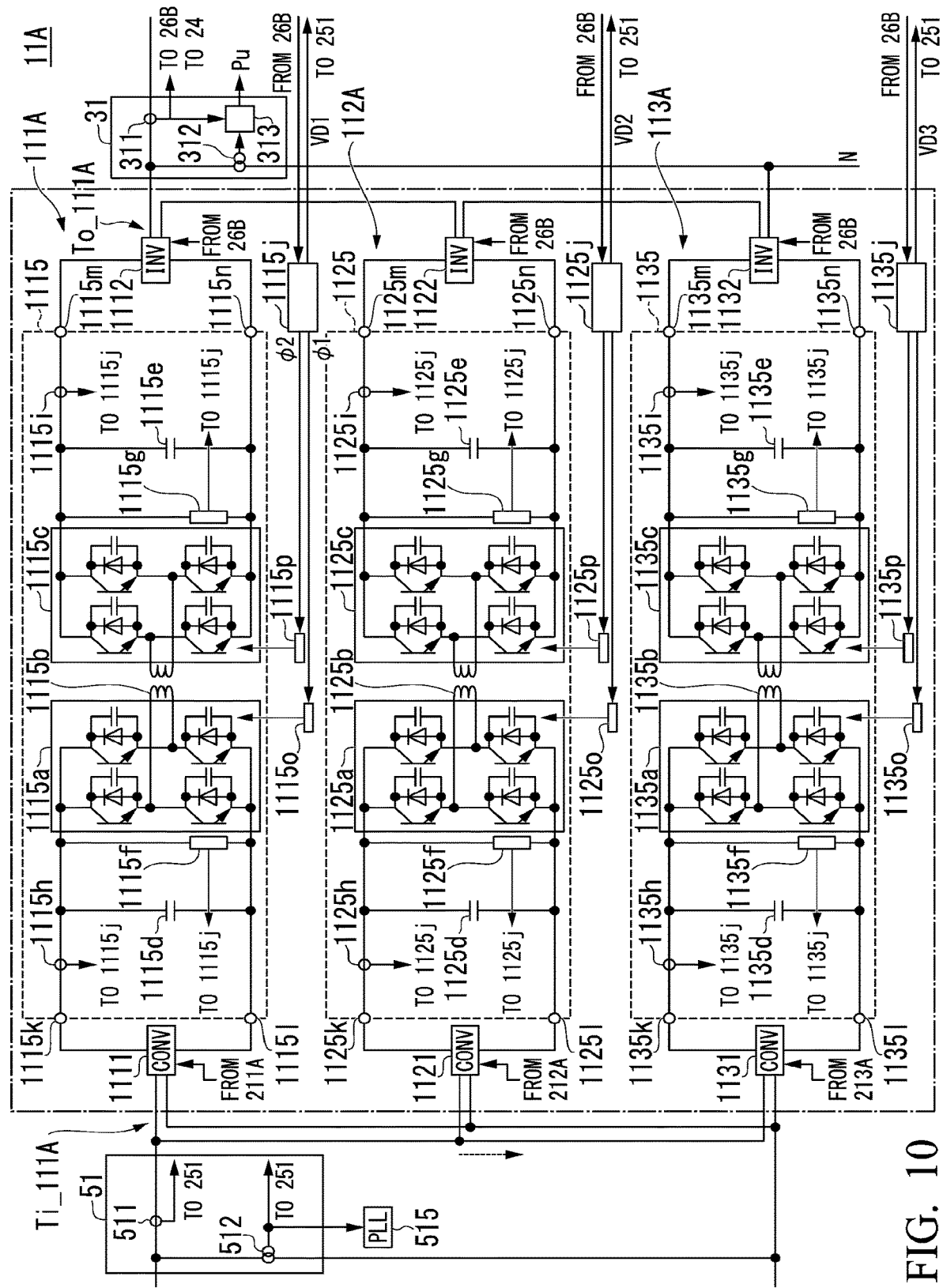
FIG. 10 is a configuration diagram of a U-phase main circuit of an embodiment.

With reference to FIG. 10, an example of the single-phase AC conversion unit 100A will be described. FIG. 10 is a configuration diagram of the U-phase main circuit 11A of the embodiment.

The U-phase main circuit 11A, for example, includes the single-phase AC conversion unit 111A, the single-phase AC conversion unit 112A, and the single-phase AC conversion unit 113A. The single-phase AC conversion unit 111A includes at least the converter 1111, the inverter 1112, and the DC/DC converter 1115.

The DC/DC converter 1115 includes an insulation type DC/DC converter. The DC/DC converter 1115 is an example of an insulating unit. The DC/DC converter 1115 is arranged between the converter 1111 and the inverter 1112 in the single-phase AC conversion unit 111A.

For example, the DC/DC converter 1115 includes a first converter 1115a (DC/AC converter), a high frequency link 1115b, a second converter 1115c, a capacitor 1115d, a capacitor 1115e, a voltage sensor 1115f, a voltage sensor 1115g, a current sensor 1115h, a current sensor 1115i, a control circuit 1115j, input terminals 1115k and 1115l, output terminals 1115m and 1115n, and individual control units 1115o and 1115p.

The first converter 1115a converts DC power (second DC power) based on DC power converted by the converter 1111 into third single-phase AC power under the control of the control circuit 1115j to be described below, and outputs the third single-phase AC power to the high frequency link 1115b. Between the input terminals 1115k and 1115l of the first converter 1115a, the capacitor 1115d is provided to smooth the output of the converter 1111. The frequency of a fundamental wave of the third single-phase AC power is higher than that of a fundamental wave of commercial AC power.

For example, the first converter 1115a includes a plurality of semiconductor switches similarly to the aforementioned inverter 1112. The semiconductor switches of the first converter 1115a are provided with capacitors connected in parallel to the respective semiconductor switches.

The high frequency link 1115b includes a transformer having a primary winding and a secondary winding. The high frequency link 1115b may include a reactor (not illustrated) connected in series to the primary winding and a reactor (not illustrated) connected in series to the secondary winding. In the following description, the reactor will not be described. The primary winding of the high frequency link 1115b is connected between the output terminals of the first converter 1115a. The secondary winding of the high frequency link 1115b is connected between the input terminals of the second converter 1115c. The high frequency link 1115b transmits power while insulating between the first converter 1115a and the second converter 1115c to be described below. The single-phase AC power transmitted by the high frequency link 1115b is an example of single-phase AC power based on the first single-phase AC power. For example, the winding ratio of the aforementioned transformer is set to 1.

The second converter 1115c converts the single-phase AC power transmitted by the high frequency link 1115b into DC power (first DC power) under the control of the control circuit 1115j to be described below, and outputs the DC power. Between the output terminals 1115m and 1115n of the second converter 1115c, the capacitor 1115e for smoothing is provided.

For example, the second converter 1115c includes a plurality of semiconductor switches similarly to the aforementioned converter 1111. The semiconductor switches of the second converter 1115c are provided with capacitors connected in parallel thereto.

The DC/DC converter 1115 formed as described above has an insulation property due to the operation of the high frequency link 1115b.

The voltage sensor 1115f detects a voltage between the input terminals 1115k and 1115l of the first converter 1115a.

A first DC link is connected to the input terminals 1115k and 1115l. The voltage sensor 1115f detects the voltage between the input terminals 1115k and 1115l as a voltage of the first DC link. In addition, the voltage sensor 1115f detects the DC voltage VD1 of the first DC link of the U-phase main circuit 11A, instead of the aforementioned the voltage sensor 11412.

The voltage sensor 1115g detects a voltage between the output terminals 1115m and 1115n of the second converter 1115c. A second DC link is connected to the output terminals 1115m and 1115n. The voltage sensor 1115g detects the voltage between the output terminals 1115m and 1115n as a voltage of the second DC link.

The current sensor 1115h, for example, is provided between the converter 1111 and a contact point of the capacitor 1115d in the first DC link, and detects a current flowing between the converter 1111 and the contact point of the capacitor 1115d in the first DC link. The current detected by the current sensor 1115h corresponds to a current flowing through a positive pole (first pole) of the first DC link.

The current sensor 1115i, for example, is provided between a contact point of the capacitor 1115e and the inverter 1112 at the first pole of the second DC link, and detects a current flowing between the contact point of the capacitor 1115e and the inverter 1112 at the first pole of the second DC link. The current detected by the current sensor 1115i corresponds to a current flowing through a positive pole (first pole) of the second DC link.

The control circuit 1115j controls the first converter 1115a and the second converter 1115c on the basis of the detection results of the voltage sensors 1115f and 1115g, the detection results of the current sensors 1115h and 1115i, and a command for converting desired DC power. FIG. 10 does not illustrate a part of connections among the control circuit 1115j, the voltage sensors 1115f and 1115g, and the current sensors 1115h and 1115i.

The DC voltage of the capacitor 1115d, which is the input of the DC/DC converter 1115, is controlled by the converter 1111 so as to be a target value of desired DC voltage, similarly to the aforementioned embodiment. The control circuit 1115j controls active power, which is transmitted by the DC/DC converter 1115 through the high frequency link 1115b, such that the output voltage of the second converter 1115c is the target value.

Specifically, for example, the control circuit 1115j sets the pulse widths a and 13 of gate pulses supplied to the first converter 1115a and the second converter 1115c such that an effective value of a high frequency voltage generated by the first converter 1115a and an effective value of a high frequency voltage generated by the second converter 1115c coincide with each other. The control circuit 1115j sets a phase difference θHFL between the two high frequency voltages such that desired DC power flows from the first DC link to the second DC link. The control circuit 1115j generates control signals φ1 and φ2 based on the set pulse widths a and 13 and phase difference θHFL. The control circuit 1115j sends the set control signal φ1 to the individual control unit 1115o, and controls the first converter 1115a by the individual control unit 1115o. The control circuit 1115j sends the set control signal φ2 to the individual control unit 1115p, and controls the second converter 1115c by the individual control unit 1115p.

The individual control units 1115o and 1115p, for example, include a PWM controller and a gate pulse generator (not illustrated). The PWM controller and the gate pulse generator may be equivalent to the PWM controller 2111 and the gate pulse generator 2112 in the aforementioned U-phase individual control unit 211. In addition, the individual control units 1115o and 1115p are communicably connected to the control circuit 1115j in a state of being electrically insulated from the control circuit 1115j.

The connections of the respective units related to the main circuit in the single-phase AC conversion unit 111A are as follows. For example, an input terminal Ti_111A of the single-phase AC conversion unit 111A also serves as an input terminal of the converter 1111. The input terminals 1115k and 1115l of the DC/DC converter 1115 are connected to the output terminals of the converter 1111 via the first DC link. The input terminals of the inverter 1112 are connected to the output terminals 1115m and 1115n of the DC/DC converter 1115 via the second DC link. The output terminal of the inverter 1112 also serves as an output terminal To_111A of the single-phase AC conversion unit 111A.

The U-phase main circuit 11A is different from the aforementioned U-phase main circuit 11 in terms of the position of the insulating unit provided in the cell. In the U-phase main circuit 11A, the DC/DC converter 1115 is provided between the converter 1111 and the inverter 1112 and the converter 1111 and the inverter 1112 are insulated from each other. U-phase individual control units 211A to 213A illustrated in the drawing and the line converter control unit 25 are insulated from each other and communicably connected to each other. V-phase individual control units 221A to 223A provided corresponding to the V-phase main circuit 12A and W-phase individual control units 231A to 233A provided corresponding to the W-phase main circuit 13A are the same as the case of the U-phase main circuit 11A.

The control circuit 1115j relays the DC voltage VD1 of the first DC link of the U-phase main circuit 11A, which is supplied from the voltage sensor 1115f, and outputs the relayed DC voltage VD1 to the reference wave generator 2511 of the line converter control unit 251. The line converter control unit 251 of the embodiment receives the DC voltage VD1 and generates a reference wave by the reference wave generator 2511. In addition, the voltage sensors 1115f, 1125f, and 1135f detect the DC voltages VD1 to VD3, respectively, instead of the aforementioned voltage sensors 11412, 11422, and 11432 in FIG. 4. The control circuits 1115j, 1125j, and 1135j relay the DC voltages VD1 to VD3 and supply relayed DC voltages VD1 to VD3 to the line converter control unit 25.

The above illustrates the single-phase AC conversion unit 111A of the U-phase main circuit 11A as an example.

The single-phase AC conversion unit 112A includes at least the converter 1121, the inverter 1112, and the DC/DC converter 1125.

For example, the DC/DC converter 1125 includes a first converter 1125a, a high frequency link 1125b, a second converter 1125c, a capacitor 1125d, a capacitor 1125e, a voltage sensor 1125f, a voltage sensor 1125g, a current sensor 1125h, a current sensor 1125i, a control circuit 1125j, input terminals 1125k and 1125l, output terminals 1125m and 1125n, and individual control units 1125o and 1125p. The DC/DC converter 1125 including at least the first converter 1125a, the high frequency link 1125b, and the second converter 1125c is an example of a DC/DC converter.

The single-phase AC conversion unit 113A includes at least the converter 1131, the inverter 1132, and the DC/DC converter 1135.

For example, the DC/DC converter 1135 includes a first converter 1135a, a high frequency link 1135b, a second converter 1135c, a capacitor 1135d, a capacitor 1135e, a voltage sensor 1135f, a voltage sensor 1135g, a current sensor 1135h, a current sensor 1135i, a control circuit 1135j, input terminals 1135k and 1135l, output terminals 1135m and 1135n, and individual control units 1135o and 1135p.

The single-phase AC conversion unit 112A and the single-phase AC conversion unit 113A are formed equivalently to the single-phase AC conversion unit 111A. Details of the single-phase AC conversion unit 112A and the single-phase AC conversion unit 113A refer to the description of the single-phase AC conversion unit 111A.

The above description mainly relates to the U-phase main circuit 11A, but is also equivalent to the V-phase main circuit 12A, and the W-phase main circuit 13A.

Description other than the above refers to the description of the aforementioned power conversion device 1. The power conversion device 1A can convert desired power by the same control as that of the aforementioned power conversion device 1.

According to the embodiment, the input side and the output side of the power conversion device 1A are insulated from each other by using the DC/DC converter 1115, so that the insulation type power conversion device 1A is provided. According to the power conversion device 1A, the connection on the AC power supply system PS side is set as the delta connection by the combination of the single-phase AC conversion units 111A to 113A, the single-phase AC conversion units 121A to 123A, and the single-phase AC conversion units 131A to 133A, so that the reactive power control of the technique described in the first embodiment becomes possible. Furthermore, even though the active power from the output terminals of the power conversion device 1A is imbalanced among the three phases, balanced active power can be received from the AC power supply system PS.

First Modification Example of Third Embodiment

A first modification example of the third embodiment will be described.

In the third embodiment, an example in which the active power of the output terminals TU, TV, and TW of the power conversion device 1A is used for control has been described. Instead, a power conversion device 1B of the present modification example uses DC power, which is transmitted via the first DC link of each cell, for control. This will be described below.

Figure 11:
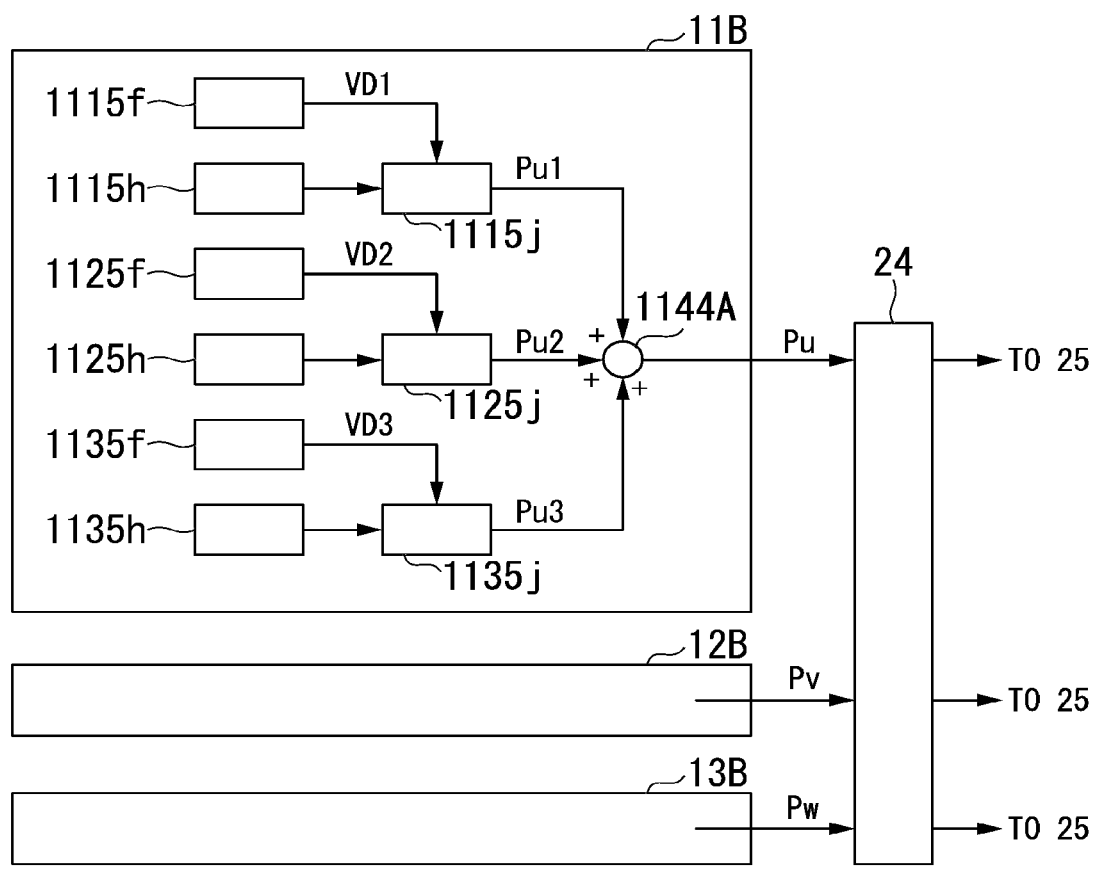
FIG. 11 is a diagram for explaining the calculation of active power according to a power conversion device of a first modification example of a third embodiment.

FIG. 11 is a diagram for explaining the calculation of active power according to the power conversion device 1B of the first modification example of the third embodiment. The range illustrated in FIG. 11 schematically illustrates a part related to the calculation of the active power in the power conversion device 1B.

The power conversion device 1B includes a U-phase main circuit 11B, a V-phase main circuit 12B, and a W-phase main circuit 13B instead of the aforementioned U-phase main circuit 11A, V-phase main circuit 12A, and W-phase main circuit 13A. The U-phase main circuit 11B, for example, further includes an adder 1144A compared with the U-phase main circuit 11A. Configurations other than the range related to the calculation of the active power in the U-phase main circuit 11B, the V-phase main circuit 12B, and the W-phase main circuit 13B are the same as those of the U-phase main circuit 11A, the V-phase main circuit 12A, and the W-phase main circuit 13A.

The U-phase main circuit 11B of the present modification example uses a set of the voltage sensor 1115f and the current sensor 1115h, a set of the voltage sensor 1125f and the current sensor 1125h, and a set of the voltage sensor 1135f and the current sensor 1135h in the U-phase main circuit 11B in order to calculate the U-phase active power.

The control circuit 1115j multiplies the DC voltage VD1 of the first DC link detected by the voltage sensor 1115f and the DC current detected by the current sensor 1115h, thereby calculating power converted by the DC/DC converter 1115. The calculated power is referred to as active power Pu1.

The control circuit 1125j multiplies the DC voltage VD2 of the first DC link detected by the voltage sensor 1125f and the DC current detected by the current sensor 1125h, thereby calculating power converted by the DC/DC converter 1125. The calculated power is referred to as active power Pu2.

The control circuit 1135j multiplies the DC voltage VD3 of the first DC link detected by the voltage sensor 1135f and the DC current detected by the current sensor 1135h, thereby calculating power converted by the DC/DC converter 1135. The calculated power is referred to as active power Pu3.

The adder 1144A adds the active power Pu1, the active power Pu2, and the active power Pu3 of each cell, and outputs the addition sum to the reactive power command value generation unit 24, instead of the active power Pu of the output terminal TU. The control circuit 1115j, the control circuit 1125j, and the control circuit 1135j are an example of operation units.

The above is a description for the calculation of the U-phase active power, but the same applies to the cases of the phase V and the phase W. The V-phase main circuit 12B calculates the active power Pv of the output terminal TV. The W-phase main circuit 13B calculates the active power Pw of the output terminal TW. The active power Pv and the active power Pw are similarly output to the reactive power command value generation unit 24.

In the case of the present modification example, the position where the current sensor 1115h is provided in the first DC link of the U-phase main circuit 11B is a position on the converter 1111 side from a contact point at which the capacitor 1115d is connected to the first DC link. In such a case, the current sensor 1115h can measure a DC current flowing from the converter 1111 to the capacitor 1115d. The current sensor 1125h and the current sensor 1135h are also the same as the current sensor 1115h.

According to the modification example, on the basis of the current flowing to the first DC link, it is possible to calculate active power that is output to each phase.

In addition, the position of the current sensor 1115h may be replaced with the output side of the DC/DC converter 1135, and a current flowing from the second converter 1115c to the capacitor 1115e in the second DC link may be measured.

Second Modification Example of Third Embodiment

The first modification example of the third embodiment has described an example in which the power conversion device 1B uses the DC power, which is transmitted via the first DC link of each cell, for control. A power conversion device 1C of the present modification example uses DC power, which is transmitted via the second DC link of each cell, for control. This will be described below.

Figure 12:
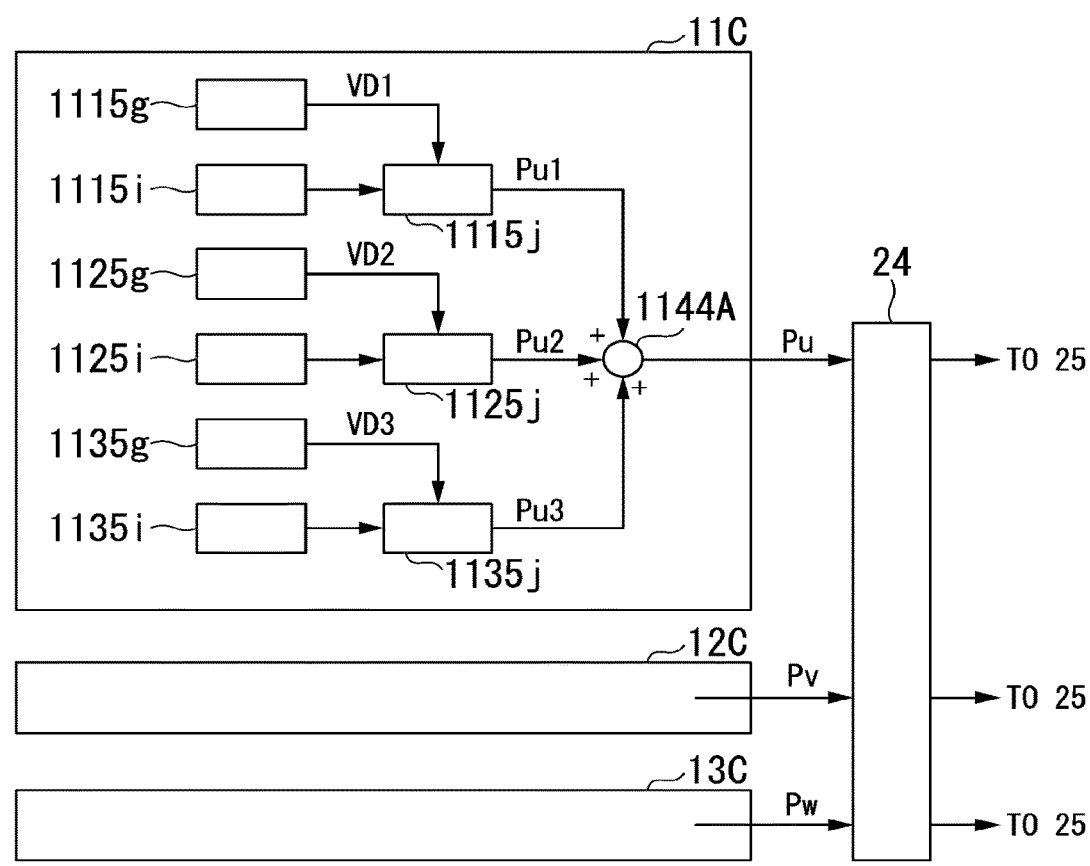
FIG. 12 is a diagram for explaining the calculation of active power according to a power conversion device B of a second modification example of a third embodiment.

FIG. 12 is a diagram for explaining the calculation of active power according to the power conversion device 1C of the second modification example of the third embodiment. The range illustrated in FIG. 12 schematically illustrates a part related to the calculation of the active power in the power conversion device 1C.

The power conversion device 1C includes a U-phase main circuit 11C, a V-phase main circuit 12C, and a W-phase main circuit 13C instead of the aforementioned U-phase main circuit 11A, V-phase main circuit 12A, and W-phase main circuit 13A. The U-phase main circuit 11C, for example, further includes an adder 1144A compared with the U-phase main circuit 11A. Configurations other than the range related to the calculation of the active power in the U-phase main circuit 11C, the V-phase main circuit 12C, and the W-phase main circuit 13C are the same as those of the U-phase main circuit 11A, the V-phase main circuit 12A, and the W-phase main circuit 13A.

The U-phase main circuit 11C of the present modification example uses a set of the voltage sensor 1115g and the current sensor 1115i, a set of the voltage sensor 1125g and the current sensor 1125i, and a set of the voltage sensor 1135g and the current sensor 1135i in the U-phase main circuit 11C in order to calculate the U-phase active power.

The control circuit 1115j multiplies the DC voltage VD1 of the first DC link detected by the voltage sensor 1115g and the DC current detected by the current sensor 1115i, thereby calculating power converted by the DC/DC converter 1115. The calculated power is referred to as active power Pu1.

The control circuit 1125j multiplies the DC voltage VD2 of the first DC link detected by the voltage sensor 1125g and the DC current detected by the current sensor 1125i, thereby calculating power converted by the DC/DC converter 1125. The calculated power is referred to as active power Pu2.

The control circuit 1135j multiplies the DC voltage VD3 of the first DC link detected by the voltage sensor 1135g and the DC current detected by the current sensor 1135i, thereby calculating power converted by the DC/DC converter 1135. The calculated power is referred to as active power Pu3.

The adder 1144A adds the active power Pu1, the active power Pu2, and the active power Pu3 of each cell, and outputs the addition sum to the reactive power command value generation unit 24, instead of the active power Pu of the output terminal TU. The control circuit 1115j, the control circuit 1125j, and the control circuit 1135j are an example of operation units.

The above is a description for the calculation of the U-phase active power, but the same applies to the cases of the phase V and the phase W. The V-phase main circuit 12C calculates the active power Pv of the output terminal TV. The W-phase main circuit 13C calculates the active power Pw of the output terminal TW. The active power Pv and the active power Pw are similarly output to the reactive power command value generation unit 24.

In the case of the present modification example, the position where the current sensor 1115i is provided in the second DC link of the U-phase main circuit 11C is a position on the inverter 1112 side from a contact point at which the capacitor 1115e is connected to the second DC link. In such a case, the current sensor 1115i can measure a DC current flowing from the capacitor 1115e to the inverter 1112. The current sensor 1125i and the current sensor 1135i are also the same as the current sensor 1115i.

According to the modification example, on the basis of the current flowing to the second DC link, it is possible to calculate active power that is output to each phase.

In addition, the position of the current sensor 1115i may be replaced with the output side of the DC/DC converter 1135, and a current flowing from the capacitor 1115d to the first converter 1115a in the first DC link may be measured.

In addition, the active power calculated on the basis of the line voltage and the line current on the AC power supply system PS side may be used for control, and the active power calculated on the basis of the voltage reference signal and the current reference signal within the inverter control unit 26B may be used for control. Since details are the same as those of the previously described example, the details will be omitted.

According to the aforementioned at least one embodiment, the power conversion device 1 includes the plurality of single-phase AC conversion units 100, the controller 20, the AC power input terminals (input terminals TA, TB, and TC), and the AC power output terminals (output terminals TU, TV, and TW). The single-phase AC conversion unit 100 includes at least the converter 1111, the inverter 1112, and the transformer 1113. The converter 1111 is formed as a voltage type, converts single-phase AC power based on the aforementioned first three-phase AC power into DC power by the switching of the switching elements SD1a to SD1d, and outputs the DC power to the capacitor 1114. The inverter 1112 converts DC power based on the DC power converted by the converter 1111 into second single-phase AC power by the switching of the switching elements SD2a to SD2d, and outputs the second single-phase AC power to the output terminal of the single-phase AC conversion unit 100. The transformer 1113 transmits power while insulating between the input terminal and the output terminal of the single-phase AC conversion unit 100, thereby supplying power to at least the inverter 1112.

The single-phase AC conversion unit 111 (first single-phase AC conversion unit) has the input terminal connected to the line A-line B between the phase A and the phase B of the first three-phase AC. The single-phase AC conversion units 112 (second single-phase AC conversion unit) is connected to the line B-line C between the phase B and the phase C of the first three-phase AC. The single-phase AC conversion unit 113 (third single-phase AC conversion unit) is connected to the line C-line A between the phase C and the phase A of the first three-phase AC. The single-phase AC conversion unit 111, the single-phase AC conversion unit 112, and the single-phase AC conversion unit 113 form the delta-connected load for the AC power supply system PS. At least the single-phase AC conversion unit 111, the single-phase AC conversion unit 112, and the single-phase AC conversion unit 113 form a set in which respective output terminals are connected in series one another. The first set and the second set and the third set, which are different from the first set, form each phase of a star connected power supply.

The controller 20 controls each of at least the switching elements SD1a to SD1d and SD2a to SD2d to be brought into any one of an ON state as a conductive state and an OFF state as a non-conductive state. The controller 20 includes the active power acquisition units 31 to 33, the reactive power command value generation unit 24, and the line converter control unit 25. The active power acquisition units 31 to 33 acquire the values related to the active power supplied to the motor 2 side from the output terminals of the second three-phase AC. On the basis of the values related to the active power acquired by the active power acquisition units 31 to 33, the reactive power command value generation unit 24 generates a reactive power command value for designating reactive power that is output from the AC power input terminals to the AC power supply system PS. On the basis of the reactive power command value, the line converter control unit 25 controls the reactive power of the converter 1111 to which the reactive power command value is supplied. In this way, the power conversion device 1 can reduce the influence of unbalance among the phases of the active power supplied to the load side of the power conversion device 1 to the AC power supply system PS side.

In addition, the aforementioned controller 20, for example, includes a storage unit, a central processing unit (CPU), a driving unit, and an acquisition unit, which are not illustrated. The storage unit, the CPU, the driving unit, and the acquisition unit, for example, are connected in the controller via BUS. The storage unit includes a semiconductor memory. The CPU includes a processor that performs desired processing according to a software program. The driving unit generates a control signal for each element of the power conversion device 1 under the control of the CPU. The acquisition unit acquires detection results of each current sensor and each voltage sensor. For example, the CPU of the controller 20 controls the main circuit of each phase by the driving unit on the basis of the detection results of the current sensor and the voltage sensor acquired by the acquisition unit. The controller 20 may perform a part or all of the processing by executing the software program as described above, or by hardware instead of the software program. Furthermore, the controller 20 may be appropriately divided, or the insulation property of the circuit may be ensured by the division.

While preferred embodiments of the invention have been described and shown above, it should be understood that these are presented as examples and do not limit the scope of the invention. These embodiments can be embodied in various forms and various omissions, substitutions, and modifications can be made without departing from the spirit or scope of the present invention. These embodiments and modifications thereof are included in the spirit or scope of the present invention and are included in the invention disclosed in the appended claims and the equivalent range thereof.

In the above description of the embodiments, a single-phase self-excited converter of two levels is included as the converter, the inverter, and the insulation type DC/DC converter of each cell; however, the converter, the inverter, and the insulation type DC/DC converter of each cell are not limited thereto and may be a single-phase self-excited converter of three levels or arbitrary three levels or more. In such a case, capacitors corresponding to the number of levels may be provided.

In the above description, an example of a full-bridge type has been illustrated as the converter, the inverter, and the insulation type DC/DC converter of each cell; however, the present invention is not limited thereto and appropriate configuration modifications are possible.

The transformers 1113, 1123, and 1133 correlated to the phase U of the second three-phase AC may not be magnetically coupled to one another. In such a case, the primary windings of the transformers 1113, 1123, and 1133 can be configured independently of one another for each of the single-phase AC conversion units 111 to 113. Instead of this, the single-phase AC conversion units 111 to 113 correlated to the phase U of the second three-phase AC may be formed by magnetic coupling. In such a case, the primary windings of the transformers 1113, 1123, and 1133 may be formed to be commonly used by the single-phase AC conversion units 111 to 113.

REFERENCE SIGNS LIST

1, 1A, 1B, 1C Power conversion device
2 Motor
3 Motor driving system
10 AC conversion unit main circuit
11, 11A, 11B, 11C U-phase main circuit
12, 12A, 12B, 12C V-phase main circuit
13, 13A, 13B, 13C W-phase main circuit
20 Controller
21, 22, 23 Individual control unit
24 Reactive power command value generation unit
25 Line converter control unit (reactive power control unit)
26, 26A, 26B Inverter control unit
31, 32, 33 Active power acquisition unit
100, 100A Single-phase AC conversion unit
211 to 213 U-phase individual control unit
221 to 223 V-phase individual control unit
231 to 233 W-phase individual control unit
251 to 253 Line converter control unit
41, 51 Current voltage detection circuit
311, 321, 331, 11411, 11421, 11431, 1151 Current sensor
312, 322, 332, 11412, 11422, 11432, 1152 Voltage sensor
313, 323, 333 Active power calculation unit
1111, 1121, 1131 Converter
1112, 1122, 1132 Inverter
1113, 1123, 1133 Transformer
1114, 1124, 1134 Capacitor
1115, 1125, 1135 DC/DC converter

The invention claimed is:

1. A power conversion device having AC power input terminals for receiving first three-phase AC power from an AC power supply system and AC power output terminals for outputting second three-phase AC power to a system to which a load is connected, the power conversion device comprising:
 a plurality of single-phase AC conversion units each having at least first and second switching elements and configured to convert a part of the first three-phase AC power supplied to input terminals thereof to output from output terminals thereof; and
 a controller configured to control each of the first and second switching elements to be brought into any one of an ON state as a conductive state and an OFF state as a non-conductive state,
 wherein the single-phase AC conversion unit comprises at least:
 a voltage type converter configured to convert single-phase AC power based on the first three-phase AC power into DC power by switching of the first switching element and output the DC power to a capacitor;
 an inverter configured to convert second DC power based on the DC power converted by the converter into second single-phase AC power by switching of the second switching element and output the second single-phase AC power to the output terminals of the single-phase AC conversion unit; and
 an insulating unit including a transformer and configured to insulate between the input terminals and the output terminals of the single-phase AC conversion unit and to transmit power to be supplied to at least the load,
 in the plurality of single-phase AC conversion units, a first single-phase AC conversion unit, which has input terminals connected to a first line of a first phase and a second line of a second phase of the first three-phase AC, a second single-phase AC conversion unit, which is connected to the second line of the second phase and a third line of a third phase of the first three-phase AC, and a third single-phase AC conversion unit, which is connected to the third line of the third phase and the first line of the first phase of the first three-phase AC, form a delta-connected load for the AC power supply system, at least the first single-phase AC conversion unit, the second single-phase AC conversion unit, and the third single-phase AC conversion unit form a first set in which respective output terminals are connected in series to one another, and the first set, and a second set and a third set, which are different from the first set, form each phase of a star connected power supply, and the controller comprises:

an active power acquisition unit configured to acquire a value related to active power supplied to a side of the load from output terminals of the second three-phase AC;

a reactive power command value generation unit configured to generate a reactive power command value for designating reactive power that is output from the AC power input terminals to the AC power supply system, based on the value related to the active power acquired by the active power acquisition unit; and a reactive power control unit configured to control the reactive power of the converter to which the reactive power command value is supplied.

2. The power conversion device according to claim 1, wherein the converter of the plurality of single-phase AC conversion units comprises:

a first converter of a single-phase AC conversion unit correlated to a first phase of the second three-phase AC;

a second converter of a single-phase AC conversion unit correlated to a second phase of the second three-phase AC delayed by an electric angle of 120° from the first phase of the second three-phase AC; and a third converter of a single-phase AC conversion unit correlated to a third phase of the second three-phase AC delayed by 240° from the first phase of the second three-phase AC, wherein a direction, which the first converter supplies active power from output terminals of the first phase of the second three-phase AC to the load, is employed as a reference, and the reactive power command value generation unit calculates the reactive power command value, which adds an amount of power for outputting capacitive reactive power to a second reactive power command value of the second converter, and calculates the reactive power command value, which subtracts an amount of power for outputting inductive reactive power from a third reactive power command value of the third converter, in accordance with an amount of active power supplied from the first phase of the second three-phase AC to the load.

3. The power conversion device according to claim 1, wherein the reactive power command value generation unit generates the reactive power command value indicating a reactive power value based on a product of an amount of the active power acquired by the active power acquisition unit and a reciprocal of a square root of 3.

4. The power conversion device according to claim 1, wherein the active power acquisition unit comprises:

a voltage measurement section configured to measure a phase voltage of the AC power output terminal;

a current measurement section configured to measure a phase current flowing through the AC power output terminal; and an operation unit configured to calculate the active power based on measurement results of the voltage measurement section and the current measurement section.

5. The power conversion device according to claim 1, wherein the active power acquisition unit comprises:

a voltage measurement section configured to measure a DC voltage across a first pole and a second pole of a first DC link to which the converter and a first capacitor related to the converter are connected;

a current measurement section configured to measure a DC current flowing between the converter and a contact point of the capacitor in the first DC link, at the first pole of the first DC link;

an operation unit configured to calculate the active power for each single-phase AC conversion unit based on measurement results of the voltage measurement section and the current measurement section; and an addition unit configured to add the calculated active power to the single-phase AC conversion unit related to the system to which a load is connected.

6. The power conversion device according to claim 1, wherein the active power acquisition unit comprises:

a voltage measurement section configured to measure a DC voltage across a first pole and a second pole of a second DC link which connects the capacitor and the inverter;

a current measurement section configured to measure a DC current flowing between a contact point of the capacitor and the inverter at the first pole of the second DC link;

an operation unit configured to calculate the active power for each single-phase AC conversion unit based on measurement results of the voltage measurement section and the current measurement section; and an addition unit configured to add the calculated active power to the single-phase AC conversion unit related to the system to which a load is connected.

7. The power conversion device according to claim 1, wherein the active power acquisition unit comprises:

a voltage measurement section configured to measure a line voltage related to the AC power input terminal;

a current measurement section configured to measure a line current related to the AC power input terminal; and an operation unit configured to calculate the active power based on measurement results of the voltage measurement section and the current measurement section.

8. The power conversion device according to claim 1, comprising:

an inverter control unit configured to generate a voltage reference signal and a current reference signal related to control of the inverter and to control the inverter based on at least the voltage reference signal, wherein the active power acquisition unit calculates the active power supplied to a side of the load from the AC power output terminals, based on the voltage reference signal and the current reference signal generated by the inverter control unit.

9. The power conversion device according to claim 1, wherein the transformer of the insulating unit comprises:

a primary winding connected to the input terminals; and a plurality of secondary windings insulated from each other, wherein each of the plurality of secondary windings has a single-phase winding, any one of the plurality of secondary windings is connected to AC-side terminals of the converter, and DC-side terminals of the converter are connected to DC-side terminals of the inverter via a DC link.

10. The power conversion device according to claim 9, wherein the primary winding of the transformer is independent for each single-phase AC conversion unit correlated to a first phase of the second three-phase AC.

11. The power conversion device according to claim 1, wherein the insulating unit comprises:
an insulation type DC/DC converter configured to convert first DC power from the converter into the second DC power and transmit the second DC power to a rear stage,
wherein the converter converts first single-phase AC power from the input terminals into the first DC power, and
the inverter converts the second DC power from the DC/DC converter into second single-phase AC power and outputs the second single-phase AC power to the output terminals.

12. The power conversion device according to claim 11, wherein the DC/DC converter comprises:
a DC/AC converter configured to convert the first DC power from the converter;
an insulation transformer having a primary side connected to an output side of the DC/AC converter; and
an AC/DC converter connected to a secondary side of the insulation transformer.

13. The power conversion device according to claim 12, wherein a fundamental frequency of a high frequency that is output from the DC/AC converter is higher than a fundamental frequency of the first three-phase AC.

14. A motor driving system comprising:
the power conversion device according to claim 1; and
a motor to which the second three-phase AC power converted by the power conversion device is supplied.

15. A control method of a power conversion device having AC power input terminals for receiving first three-phase AC power from an AC power supply system and AC power output terminals for outputting second three-phase AC power to a system to which a load is connected,
wherein the power conversion device comprises:
a plurality of single-phase AC conversion units each having at least first and second switching elements and configured to convert a part of the first three-phase AC power supplied to input terminals thereof to output from output terminals thereof; and
a controller configured to control each of the first and second switching elements to be brought into any one of an ON state as a conductive state and an OFF state as a non-conductive state,
the single-phase AC conversion unit comprises at least:
a voltage type converter configured to convert single-phase AC power based on the first three-phase AC power into DC power by switching of the first switching element and output the DC power to a capacitor;
an inverter configured to convert second DC power based on the DC power converted by the converter into second single-phase AC power by switching of the second switching element and output the second single-phase AC power to the output terminals of the single-phase AC conversion unit; and
an insulating unit including a transformer and configured to insulate between the input terminals and the output terminals of the single-phase AC conversion unit and to transmit power to be supplied to at least the load,
the control method comprises:
a step in which a first single-phase AC conversion unit, which has input terminals connected to a first line of a first phase and a second line of a second phase of the first three-phase AC, a second single-phase AC conversion unit, which is connected to the second line of the second phase and a third line of a third phase of the first three-phase AC, and a third single-phase AC conversion unit, which is connected to the third line of the third phase and the first line of the first phase of the first three-phase AC, form a delta-connected load for the AC power supply system;
a step in which at least the first single-phase AC conversion unit, the second single-phase AC conversion unit, and the third single-phase AC conversion unit form a first set in which respective output terminals are connected in series to one another, and the first set, and a second set and a third set, which are different from the first set, form each phase of a star connected power supply;
a step in which an active power acquisition unit acquires a value related to active power supplied to a side of the load from output terminals of the second three-phase AC;
a step in which a reactive power command value for designating reactive power that is output from the AC power input terminals to the AC power supply system, is generated based on the value related to the active power acquired by the active power acquisition unit; and
a step in which reactive power of the converter, to which the reactive power command value is supplied, is controlled.

* * * * *